United States Patent
Shiraki

(10) Patent No.: US 11,913,896 B2
(45) Date of Patent: Feb. 27, 2024

(54) HUMIDITY SENSOR AND RFID TAG INCLUDING THE SAME

(71) Applicant: Murata Manufacturing Co., Ltd., Nagaokakyo (JP)

(72) Inventor: Hiroshi Shiraki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 608 days.

(21) Appl. No.: 17/125,552

(22) Filed: Dec. 17, 2020

(65) Prior Publication Data

US 2021/0109053 A1    Apr. 15, 2021

Related U.S. Application Data

(63) Continuation of application No. PCT/JP2019/024984, filed on Jun. 24, 2019.

(30) Foreign Application Priority Data

Jul. 4, 2018   (JP) ................... 2018-127523

(51) Int. Cl.
*G01N 27/22* (2006.01)
*G01N 27/12* (2006.01)
*G06K 19/077* (2006.01)

(52) U.S. Cl.
CPC ......... *G01N 27/223* (2013.01); *G01N 27/121* (2013.01); *G01N 27/122* (2013.01); *G01N 27/228* (2013.01); *G06K 19/07773* (2013.01)

(58) Field of Classification Search
CPC .. G01N 27/223; G01N 27/121; G01N 27/122; G01N 27/228; G06K 19/07773
See application file for complete search history.

(56) References Cited

U.S. PATENT DOCUMENTS

| 4,651,121 A | 3/1987 | Furubayashi et al. |
| 6,222,376 B1 | 4/2001 | Tenney, III |

(Continued)

FOREIGN PATENT DOCUMENTS

| JP | S5991355 A | 5/1984 |
| JP | S60239657 A | 11/1985 |

(Continued)

OTHER PUBLICATIONS

International Search Report issued for PCT/JP2019/024984, dated Sep. 10, 2019.

(Continued)

*Primary Examiner* — Ryan D Walsh
(74) *Attorney, Agent, or Firm* — ArentFox Schiff LLP

(57) ABSTRACT

A humidity sensor is provided with a first electrode electrically connected to a first terminal, and a moisture-sensitive member. The first electrode may include a first internal electrode unit. The first internal electrode unit may include a first main surface covered with the moisture-sensitive member, and a second main surface covered with the moisture-sensitive member. The humidity sensor may further include a second electrode electrically connected to the second terminal. The second electrode may include a second internal electrode unit. The second internal electrode unit may include a third main surface covered with the moisture-sensitive member, and a fourth main surface covered with the moisture-sensitive member. The first internal electrode unit may include a portion facing at least a part of the second internal electrode unit across the moisture-sensitive member.

18 Claims, 35 Drawing Sheets

(56) References Cited

U.S. PATENT DOCUMENTS

| | | | |
|---|---|---|---|
| 11,346,801 B2* | 5/2022 | Shiraki | G01K 7/16 |
| 2007/0171083 A1* | 7/2007 | Kou | G01N 27/223 |
| | | | 340/604 |
| 2010/0307238 A1* | 12/2010 | Van Popta | G01N 27/225 |
| | | | 73/335.04 |
| 2010/0321162 A1 | 12/2010 | Burd et al. | |
| 2011/0259099 A1* | 10/2011 | Hong | G01N 27/223 |
| | | | 29/874 |
| 2013/0098151 A1* | 4/2013 | Sulaiman | G01N 27/225 |
| | | | 427/79 |
| 2016/0161435 A1 | 6/2016 | Fujimoto et al. | |
| 2017/0038325 A1 | 2/2017 | Takashima et al. | |
| 2019/0257779 A1* | 8/2019 | Nakane | G01N 27/223 |

FOREIGN PATENT DOCUMENTS

| | | | | |
|---|---|---|---|---|
| JP | H0882612 A | | 3/1996 | |
| JP | 2006225454 A | | 8/2006 | |
| JP | 2007155556 A | | 6/2007 | |
| JP | 2016162230 A | | 9/2016 | |
| JP | 2018059780 A | | 4/2018 | |
| KR | 20170131105 A | * | 11/2017 | |
| WO | WO-2011149331 A1 | * | 12/2011 | ........... G01N 27/223 |
| WO | WO-2012046501 A1 | * | 4/2012 | ........... G01N 27/223 |
| WO | WO-2012067488 A1 | * | 5/2012 | ........... G01N 27/223 |
| WO | WO-2014185771 A2 | * | 11/2014 | ........... G01N 27/223 |
| WO | 2015022891 A1 | | 2/2015 | |

OTHER PUBLICATIONS

Written Opinion of the International Searching Authority issued for PCT/JP2019/024984, dated Sep. 10, 2019.

* cited by examiner

CAPACITANCE IN CASE OF COMB ELECTRODE

| Sensor element | 1-1 | 1-2 | 1-3 | 1-4 |
|---|---|---|---|---|
| 10%RH | 0.776pF | 1.321pF | 104.301pF | 1.702pF |
| 90%RH | 1.377pF | 3.292pF | 249.071pF | 2.303pF |
| Change rate | 77.4% | 149.2% | 138.8% | 35.3% |

CAPACITANCE IN CASE OF FLAT PLATE ELECTRODE

| Sensor element | 1-5 | 1-6 | 1-7 |
|---|---|---|---|
| 10%RH | 3.697pF | 3.780pF | 257.843pF |

2-2

2-3

RESONANCE FREQUENCY IN CASE OF PLANAR COIL ELECTRODE

| Sensor element | 2-1 | 2-2 | 2-3 |
|---|---|---|---|
| 10%RH | 8.039GHz | 5.927GHz | 0.727GHz |

FIG. 36
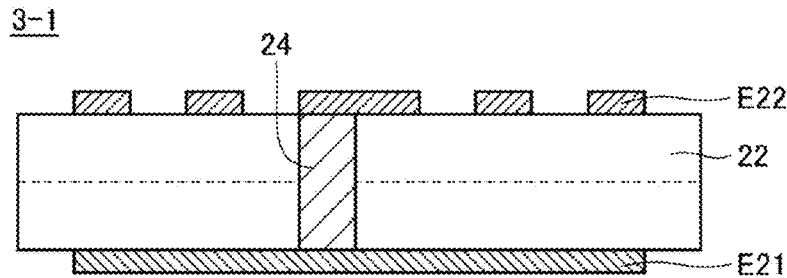
FIG. 37
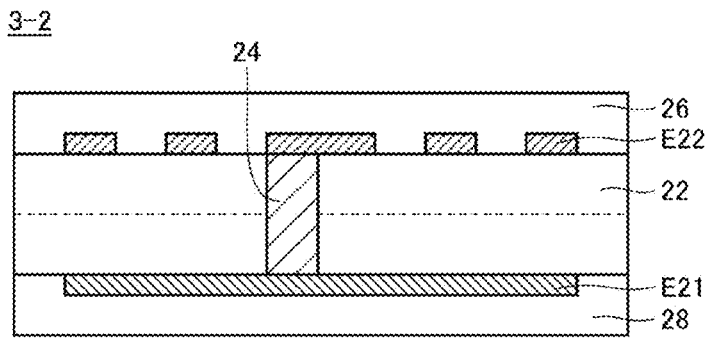
FIG. 38
RESONANCE FREQUENCY IN CASE OF PLANAR COIL + FLAT PLATE ELECTRODES
| Sensor element | 3-1 | 3-2 |
|---|---|---|
| 10%RH | 11.660GHz | 10.210GHz |
FIG. 39
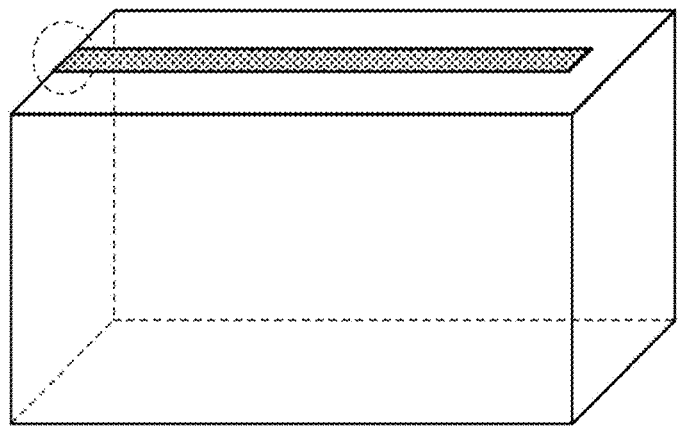

4-1

4-2

FIG. 48
RESONANCE FREQUENCY WITH OR WITHOUT EXTERNAL ELECTRODE
| Sensor element | 4-1 | 4-2 |
|---|---|---|
| With external electrode | 104.301pF | 0.727GHz |
| Without external electrode | 107.512pF | 0.692GHz |
| Change rate | +3.08% | -4.81% |
FIG. 49
30
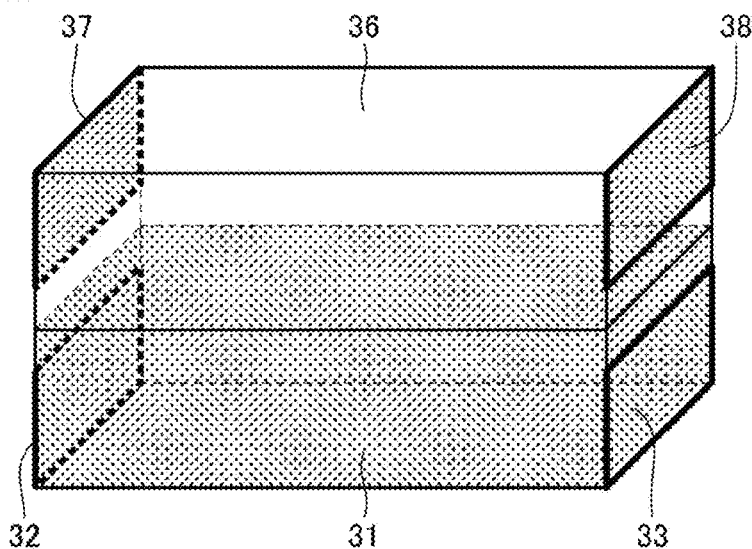
FIG. 50
40
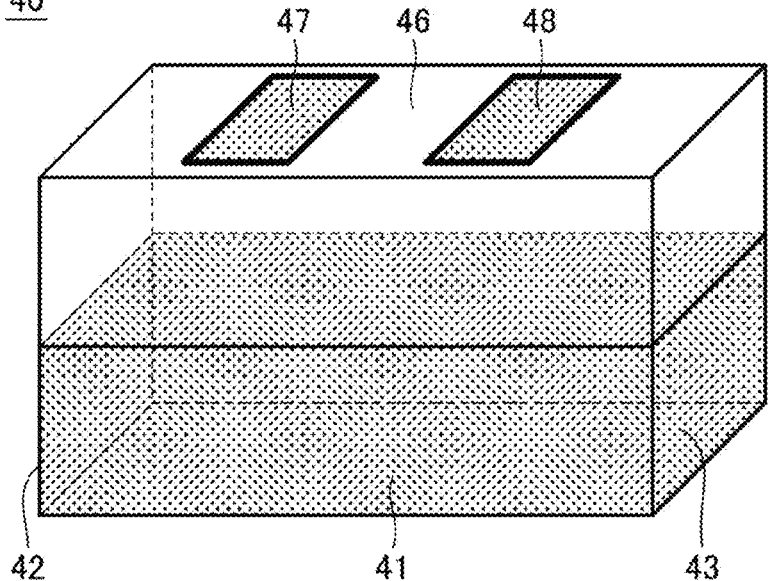

5-1

5-1

70

80

6-1

6-2

FIG. 59
CAPACITANCE IN CASE OF POLYIMIDE + BATIO$_3$ COMPOSITE

| Sensor element | 7-1 | 7-2 | 7-3 |
|---|---|---|---|
| Polyimide | 0.776pF | 1.321pF | 104.301pF |
| Polyimide + BaTiO$_3$ | 6.683pF | 13.763pF | 1215.606pF |
| Change rate | 8.61 times | 10.41 times | 11.65 times |

FIG. 60
CAPACITANCE IN CASE OF POLYIMIDE + CACU$_3$TI$_4$O$_{12}$ COMPOSITE

| Sensor element | 7-4 | 7-5 | 7-6 |
|---|---|---|---|
| Polyimide | 0.776pF | 1.321pF | 104.301pF |
| Polyimide+ CaCu$_3$Ti$_4$O$_{12}$ | 31.414pF | 66.033pF | 5902.589pF |
| Change rate | 40.48 times | 49.98 times | 56.59 times |

FIG. 61
RESONANCE FREQUENCY IN CASE OF POLYIMIDE + FERRITE COMPOSITE

| Sensor element | 8-1 | 8-2 | 8-3 |
|---|---|---|---|
| Polyimide | 8.039GHz | 5.927GHz | 0.727GHz |
| Polyimide + ferrite | 4.102GHz | 0.656GHz | 0.039GHz |
| Change rate | 48.97% | 88.93% | 94.63% |

FIG. 62
RESONANCE FREQUENCY IN CASE OF POLYIMIDE + BATIO$_3$ + FERRITE COMPOSITE

| Sensor element | 9-1 | 9-2 | 9-3 |
|---|---|---|---|
| Polyimide | 8.039GHz | 5.927GHz | 0.727GHz |
| Polyimide + BT + ferrite | 2.531GHz | 0.483GHz | 0.028GHz |
| Change rate | 68.52% | 91.85% | 96.15% |

90

92  94  93

100

102  104  105  103

110

120

LAYERS HAVING DIFFERENT PROPORTIONS OF HUMIDITY SENSOR MATERIAL

FIG. 68

RESONANCE FREQUENCY AND SENSITIVITY WHEN MATERIAL DENSITY DISTRIBUTION IS PROVIDED

| Sensor element | 8-3 | 10-1 | 11-1 |
|---|---|---|---|
| Resonance frequency | 39.836MHz | 42.822MHz | 9.703MHz |
| Resonance frequency change rate (10%RH→90%RH) | 23.19% | 26.39% | 12.70% |

FIG. 70
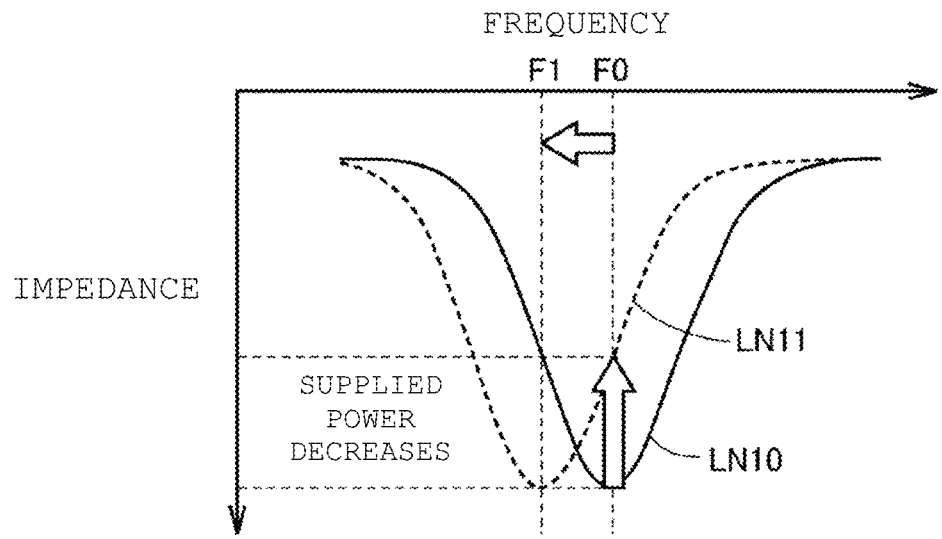
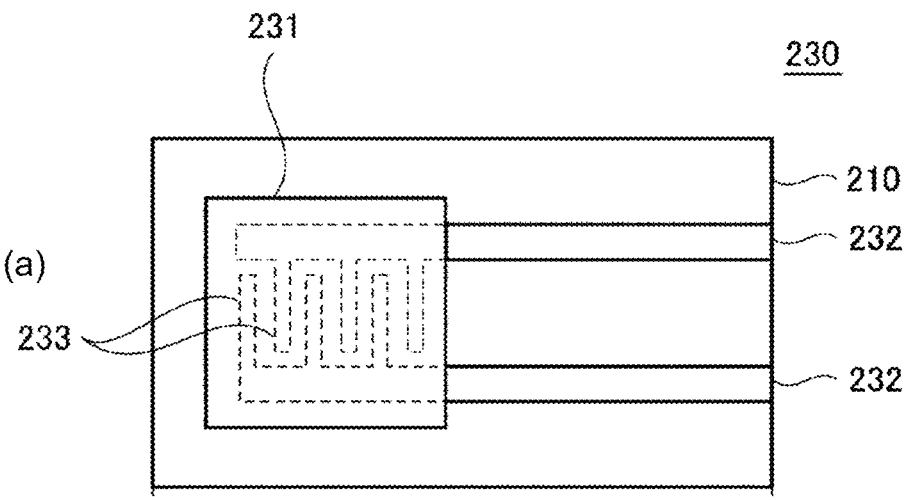
FIG. 71(a)
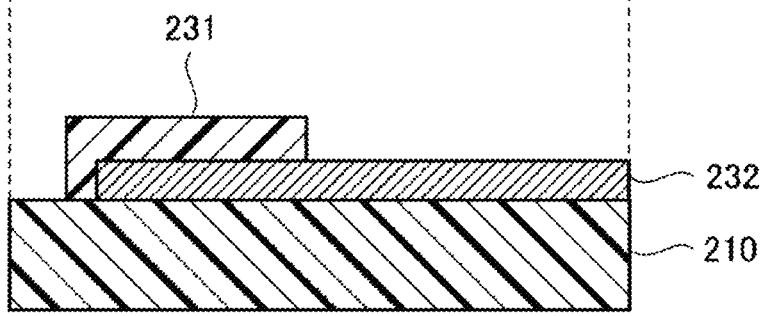
FIG. 71(b)

CHANGE IN CAPACITANCE DUE TO HUMIDITY

|  | Comparative Example | Embodiment |
|---|---|---|
| 10%RH | 0.776pF | 1.321pF |
| 90%RH | 1.377pF | 3.292pF |
| Change rate | 77.40% | 149.20% |

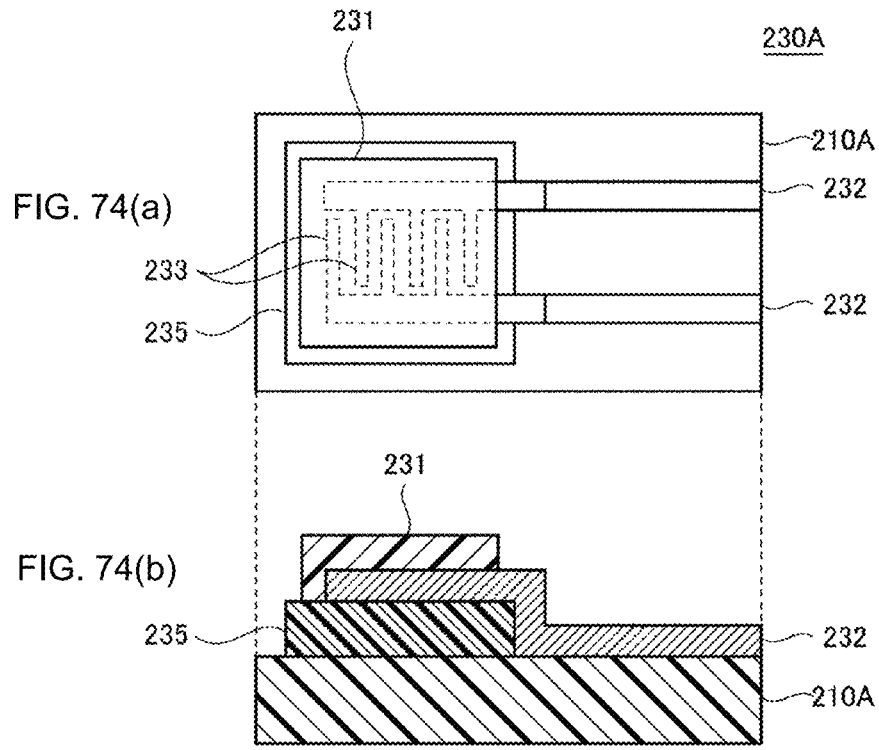
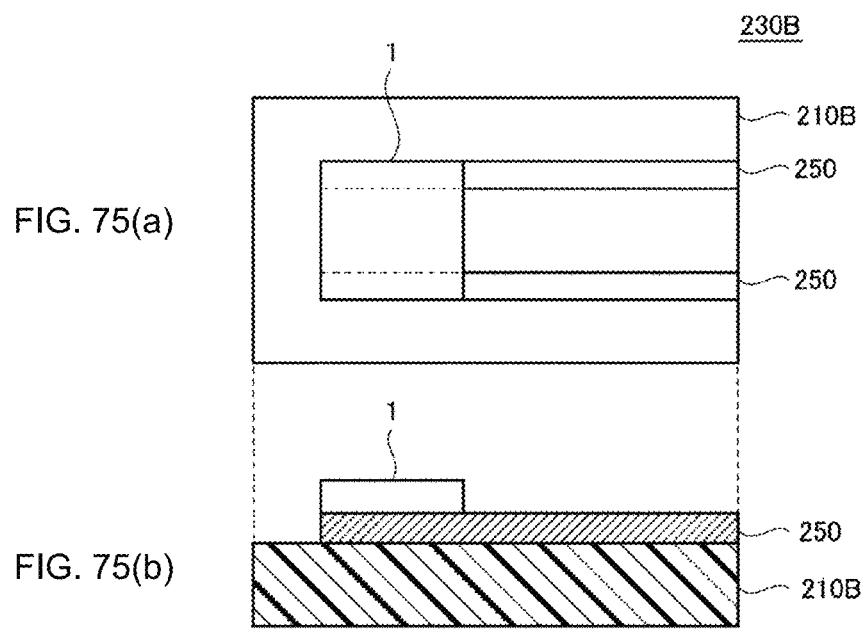

HUMIDITY SENSOR AND RFID TAG INCLUDING THE SAME

CROSS REFERENCE TO RELATED APPLICATIONS

This application is a continuation of PCT Application No. PCT/JP2019/024984, filed Jun. 24, 2019, which claims priority to Japanese Patent Application No. 2018-127523, filed Jul. 4, 2018, the entire contents of each of which are hereby incorporated in their entirety.

TECHNICAL FIELD

Aspects of the present disclosure are directed to a humidity sensor and a radio-frequency identification (RFID) tag including the humidity sensor.

BACKGROUND OF THE INVENTION

Currently, humidity sensors are being used in a wide range of applications such as printers, air conditioners, air cleaners, microwave ovens, and automotive products. Further, the recent advances on the Internet of Things (IoT) technology have increased the need to monitor not only physical information such as location and speed, but also chemical information such as temperature, humidity, and gas.

There are two types of humidity sensors: a resistance change type that measures a change in resistance of a humidity sensor material when the humidity changes; and a capacitance change type that measures a change in capacitance. Generally, the resistance change type has the advantage of a simple structure but has the disadvantages of poor accuracy and an inability to measure low humidity and high humidity. Conversely, in the capacitance change type, capacitance changes linearly with respect to a change in humidity in a wide humidity range of 0 to 100% relative humidity (RH). Hence the capacitance change type has the advantage of high accuracy and has been used in a wide range of applications.

Polymeric materials, such as polyimide, polyamide-imide, polyamide, cellulose acetate butyrate (CAB), polymethyl methacrylate (PMMA), vinyl crotonate, polyethylene terephthalate, and mixtures thereof, are often used as the humidity sensor material of the capacitance change type. The capacitance change type humidity sensor measures a change in capacitance when water is drawn into these materials, to measure the relative humidity in the atmosphere.

When the humidity sensor is modularized and the humidity is measured with a microcomputer, the humidity sensor is incorporated in an LC resonance circuit or the like to measure a resonance frequency, and the resonance frequency is converted into capacitance to measure the capacitance. A resonance frequency f in the case of the LC resonance is expressed by $f=1/(2\pi(LC))$, where L represents an inductance of an external inductor and C represents the capacitance of the humidity sensor. It is seen from this equation that the capacitance of the humidity sensor may be increased in order to lower the resonance frequency. By lowering the resonance frequency, a clock frequency for detecting the frequency may be lowered, so that the choice of the microcomputer is widened, leading to a reduction in the size and cost of the humidity sensor module. In addition, the lower the frequency is, the less likely it is to be affected by noise due to parasitic capacitance or disturbance.

For example, Japanese Patent Application Laid-Open No. Sho 60-239657 ("JP '657") discloses a humidity sensor having a structure in which a humidity sensor material sandwiched between an upper electrode and a lower electrode is disposed on a substrate. A flat plate-shaped electrode is used for each of the upper electrode and the lower electrode.

For example, Japanese Patent Application Laid-Open No. 2007-155556 ("JP '556") discloses a humidity sensor in which a pair of comb electrodes are formed on a substrate, and a humidity sensor material is formed on upper portions of the pair.

The humidity sensor disclosed in JP '657 has a structure in which the upper electrode is exposed to the surface. Therefore, when water droplets adhere to the upper electrode caused by dew condensation or the like, the capacitance of the sensor material changes in accordance with a mechanism, different from the normal mechanism, due to a change in electric resistance of an electrode material or a change in electrode area caused by the action of the water droplets as the electrode. In addition, the thickness of the humidity sensor material between the upper electrode and the lower electrode may be reduced in order to increase the capacitance. When the thickness of the humidity sensor material is reduced, the possibility of a short circuit due to adhesion of water droplets between the upper electrode and the lower electrode increases. Further, when water droplets adhere to the electrode in a state where a voltage is applied, the migration of the electrode material occurs. Thus, the structure of the humidity sensor has a problem that accurate humidity measurement may not be performed due to water droplets.

The structure of the humidity sensor further has a problem that, since the upper electrode is exposed to the atmosphere, the electrode is corroded by corrosive gas such as sulfur gas or nitrogen gas in the atmosphere to cause a great change in characteristics.

In common with JP '657 and JP '556, the surface of the humidity sensor material is covered with another material such as the electrode or the substrate. In such a configuration, drawing of water molecules to the humidity sensor material is inhibited by the electrode or the substrate. In JP '657, due to the need for water molecules to pass through the upper electrode and adhere to the humidity sensor material, the sensitivity and response/recovery speeds deteriorate. In JP '657 and JP '556, one side of the humidity sensor material is covered with the substrate or the lower electrode, which is considered to hardly permeate water, and hence a large area of the humidity sensor material is in a state not functioning as the humidity sensor.

When the structure of each of JP '657 and JP '556 is to be reduced in size while keeping the capacitance at a constant size, there is no choice but to reduce the thickness of the humidity sensor material or to narrow the pitch of the comb electrodes. However, these methods have limitations at a certain level in actual production. In addition, when the capacitance is made larger by these methods, as described above, the influence of the water droplets and the influences of the following problems increase: a decrease in the area of the sucking of the water molecules, an increase in production difficulty level, and an increase in production variations.

In order to avoid such a problem, when the humidity sensor is used in a state where the capacitance is small, noise at the time of humidity measurement becomes large due to the influence of parasitic capacitance, such as wiring. Further, when the LC resonance circuit is configured to measure the humidity, the resonance frequency becomes large to narrow the choice of the microcomputer used for measurement. This makes it difficult to reduce the size and cost of the humidity sensor module at the time of the preparation thereof.

The present invention has been made to solve the above problems, and an object of the present invention is to provide a humidity sensor having improved sensitivity.

SUMMARY OF THE INVENTION

Accordingly, it is an object of the present disclosure to provide a humidity sensor in which electric resistance or capacitance between a first terminal and a second terminal changes in accordance with humidity, and is provided with a first electrode electrically connected to the first terminal, and a moisture-sensitive member having a dielectric constant changing in accordance with humidity. The first electrode includes a first internal electrode unit having a first main surface covered with the moisture-sensitive member, and a second main surface covered with the moisture-sensitive member.

According to the present disclosure, the electrode of the moisture-sensitive sensor includes the internal electrode unit covered with the moisture-sensitive member, so that the amount of change in capacitance in accordance with a change in humidity increases to improve the sensitivity.

Additional advantages and novel features of the system of the present disclosure will be set forth in part in the description that follows, and in part will become more apparent to those skilled in the art upon examination of the following or upon learning by practice of the disclosure.

BRIEF DESCRIPTION OF THE DRAWINGS

In the descriptions that follow, like parts are marked throughout the specification and drawings with the same numerals, respectively. The drawings are not necessarily drawn to scale and certain drawings may be shown in exaggerated or generalized form in the interest of clarity and conciseness. The disclosure itself, however, as well as a preferred mode of use, further features and advances thereof, will be understood by reference to the following detailed description of illustrative implementations of the disclosure when read in conjunction with reference to the accompanying drawings, wherein:

FIG. 36 is a sectional view showing a configuration of a sensor element (3-1) as a comparative example;

FIG. 37 is a sectional view showing a configuration of a sensor element (3-2) in accordance with aspects of the present disclosure;

FIG. 38 is a diagram showing a comparison in resonance frequency between the sensor elements (3-1), (3-2);

FIG. 39 is a view showing a first example of the shape of an external electrode in a moisture-sensitive sensor in accordance with aspects of the present disclosure;

FIG. 48 is a diagram showing the results of examination of sensor elements (4-1), (4-2);

FIG. 49 is a view showing a configuration of a first example of terminal placement in a sensor element in accordance with aspects of the present disclosure;

FIG. 50 is a view showing a configuration of a second example of the terminal placement in the sensor element in accordance with aspects of the present disclosure;

FIG. 59 is a diagram showing a comparison in capacitance change between a sensor using polyimide and a sensor using a composite material of a first example;

FIG. 60 is a diagram showing a comparison in capacitance change between a sensor using polyimide and a sensor using a composite material of a second example;

FIG. 61 is a diagram showing a comparison in resonance frequency change between a sensor using polyimide and a sensor using a composite material of a third example;

FIG. 62 is a diagram showing a comparison in resonance frequency change between a sensor using polyimide and a sensor using a composite material of a fourth example;

FIG. 68 is a diagram showing the resonance frequencies and the rates of change in resonance frequency in the sensor elements having different density distributions of the humidity sensor material;

FIG. 70 is a diagram for explaining a method of measuring humidity;

FIGS. 71(a) and 71(b) are views showing a humidity sensor unit in FIG. 69;

FIGS. 74(a)-74(b) are views showing a first modification of the humidity sensor unit; and FIGS. 75(a)-75(b) are views showing a second modification of the humidity sensor unit.

DETAILED DESCRIPTION

Figure 1:
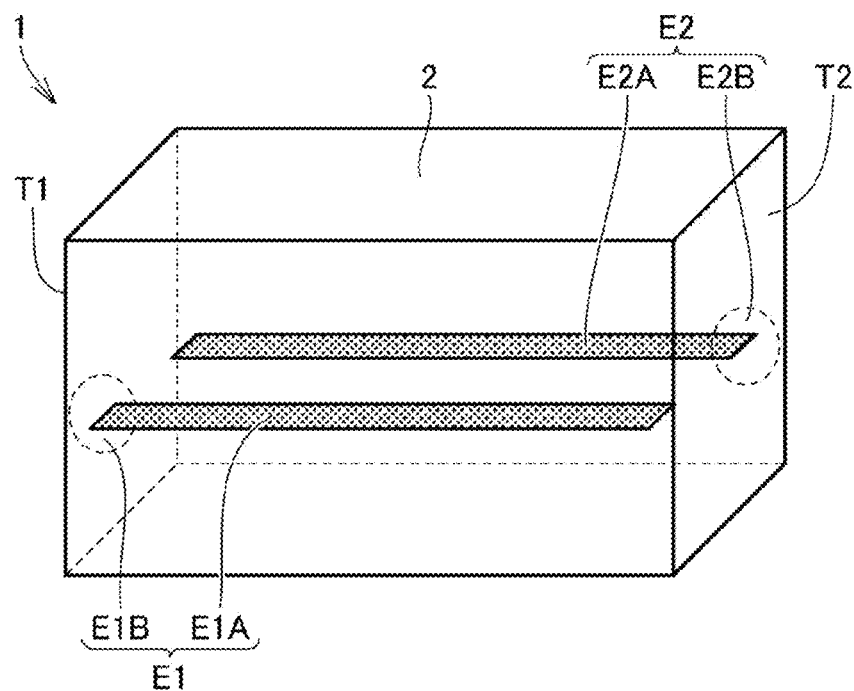
FIG. 1 is a perspective view showing a configuration of a humidity sensor in accordance with aspects of the present disclosure.

Hereinafter, examples of examination and aspects of the disclosure of the present invention will be described with reference to the drawings. Note that the same or corresponding portions in the drawings are denoted by the same reference numerals, and the description thereof will not be repeated.

Figure 2:
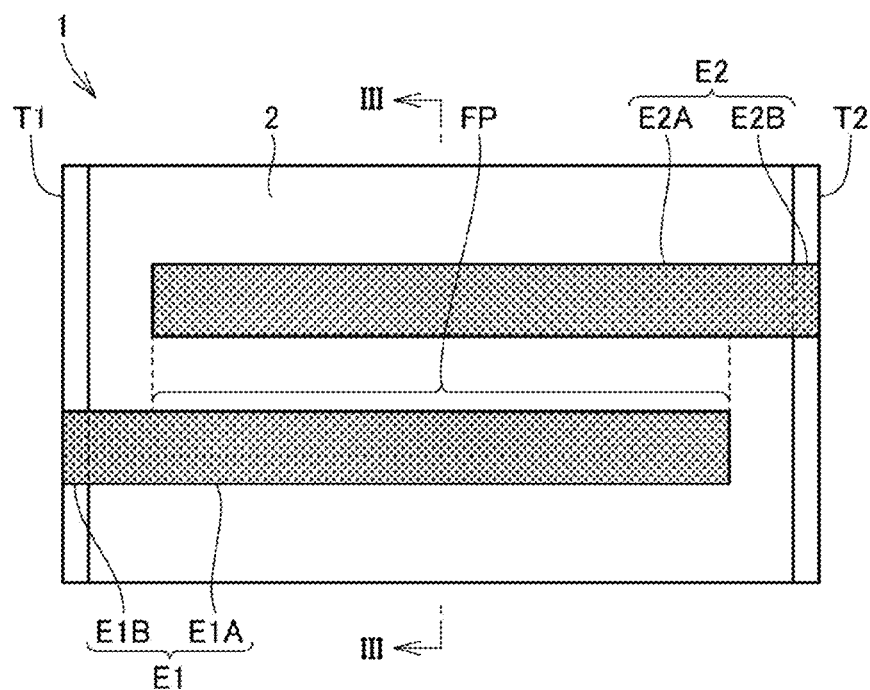
FIG. 2 is a plan view showing an electrode forming surface of the humidity sensor in accordance with aspects of the present disclosure.
Figure 3:
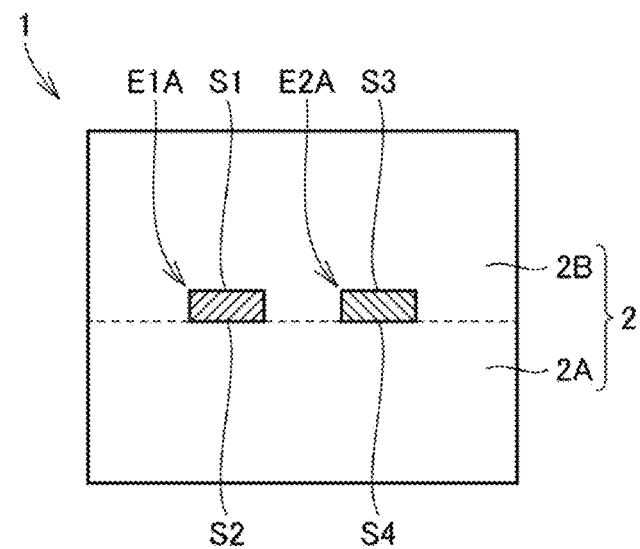
FIG. 3 is a sectional view taken along line III-III in FIG. 2.

FIG. 1 is a perspective view showing a configuration of a humidity sensor according to an aspect of the disclosure. In the perspective view shown in FIG. 1, internal electrodes E1, E2 formed on the same plane are shown in perspective. FIG. 2 is a plan view showing the electrode forming surface of the humidity sensor according to an aspect of the disclosure. FIG. 3 is a sectional view taken along line III-III in FIG. 2.

Referring to FIGS. 1-3, a humidity sensor 1 is configured such that capacitance between a first terminal T1 and a second terminal T2 changes in accordance with humidity. The humidity sensor 1 is provided with a first electrode E1 electrically connected to a first terminal T1, and a moisture-sensitive member 2 having a dielectric constant changing in accordance with humidity. The first electrode E1 includes a contact portion E1B serving as a contact to a terminal T1, and a first internal electrode unit E1A. The first internal electrode unit E1A has a first main surface S1 covered with the moisture-sensitive member 2, and a second main surface S2 covered with the moisture-sensitive member 2.

The humidity sensor 1 is further provided with a second electrode E2 electrically connected to a second terminal T2. The second electrode E2 includes a contact portion E2B serving as a contact to a terminal T2 and a second internal electrode unit E2A. The second internal electrode unit E2A has a third main surface S3 covered with the moisture-sensitive member 2, and a fourth main surface S4 covered with the moisture-sensitive member 2.

The moisture-sensitive member 2 includes: a moisture-sensitive member 2B of a first layer in contact with the respective main surfaces S1, S3 of the electrodes E1A, E2A; and a moisture-sensitive member 2A of a second layer that is disposed so as to be at least partially in contact with the moisture-sensitive member 2B of the first layer and is in contact with the main surfaces S2, S4 on the opposite sides of the electrodes E1A, E2A. The first electrode E1 and the second electrode E2 are formed on the upper surface of the moisture-sensitive member 2A. Thereafter, the first electrode E1 and the second electrode E2 are covered with the moisture-sensitive member 2B from above, and the moisture-sensitive member 2A and the moisture-sensitive member 2B are pressure-bonded and integrated. With such a configuration, the first electrode E1 and the second electrode E2 are disposed on one plane inside the moisture-sensitive member.

The first internal electrode unit E1A and the second internal electrode unit E2A are disposed across the moisture-sensitive member 2. In a portion FP, the first internal electrode unit E1A faces at least a part of the second internal electrode unit E2A.

As shown in FIGS. 1 to 3, the first electrode E1 and the second electrode E2 are provided inside the moisture-sensitive member 2 formed of a humidity sensor material having capacitance changing due to a change in humidity in the atmosphere. The first electrode E1 and the second electrode E2 are internal electrodes embedded in the moisture-sensitive member. By measuring a change in capacitance between the internal electrodes from the terminals T1, T2, the change in humidity in the atmosphere may be measured with the humidity sensor 1.

As the moisture-sensitive member 2, for example, polyimide, polyamide-imide, polyamide, cellulose acetate butyrate (CAB), polymethyl methacrylate (PMMA), vinyl crotonate, polyethylene terephthalate, or a mixture thereof may be used. Each of the first electrode E1 and the second electrode E2 used as the internal electrode may be formed of a material generally used as an electrode material, for example, a metal such as Ag, Cu, Pt, Pd, Ni, Al, or an oxide conductor such as ITO or $LaNiO_3$.

Figure 4:
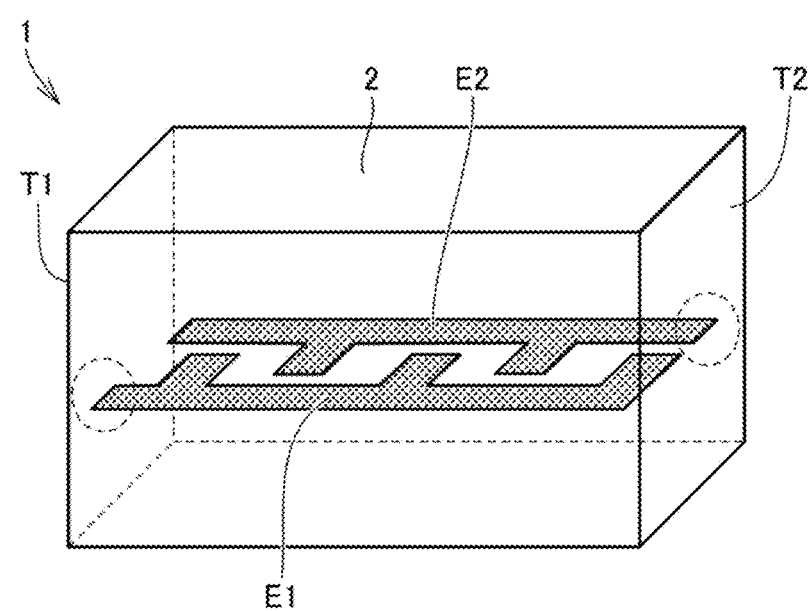
FIG. 4 is a perspective view showing a first modification of the humidity sensor in accordance with aspects of the present disclosure.
Figure 5:
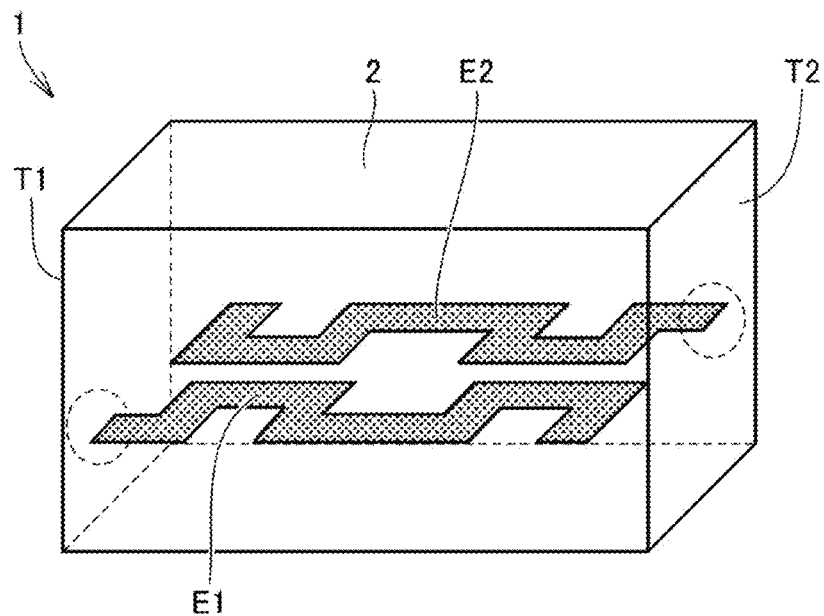
FIG. 5 is a perspective view showing a second modification of the humidity sensor in accordance with aspects of the present disclosure.

FIG. 4 is a perspective view showing a first modification of the humidity sensor according to an aspect of the disclosure. FIG. 5 is a perspective view showing a second modification of the humidity sensor according to an aspect of the disclosure. The internal electrode may have a comb electrode shape as shown in FIG. 4 or a meandering shape as shown in FIG. 5, in addition to the flat plate shape as shown in FIG. 1.

Although FIGS. 1 to 5 show an example where two internal electrodes are formed on the same plane, the electrodes may be formed on different planes.

Figure 6:
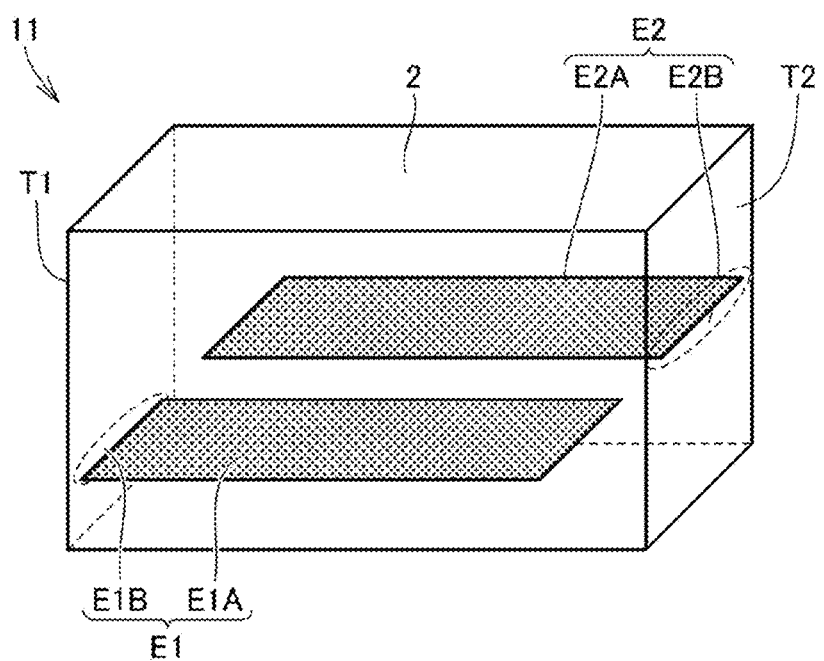
FIG. 6 is a perspective view showing a third modification of the humidity sensor in accordance with aspects of the present disclosure.
Figure 7:
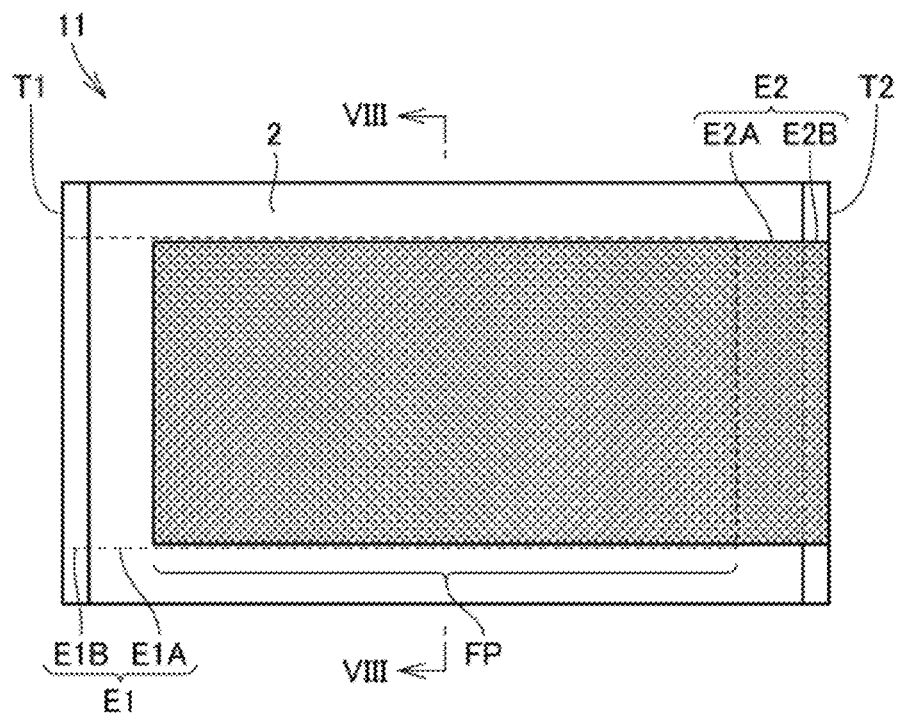
FIG. 7 is a plan view showing an electrode forming surface in the third modification in accordance with aspects of the present disclosure
Figure 8:
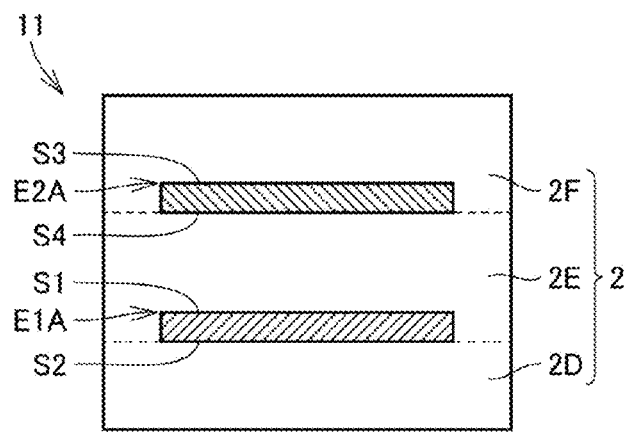
FIG. 8 is a sectional view taken along line VIII-VIII in FIG. 7.

FIG. 6 is a perspective view showing a third modification of the humidity sensor according to an aspect of the disclosure. In the perspective view shown in FIG. 6, the internal electrodes E1, E2 are formed on different planes are shown in perspective. FIG. 7 is a plan view showing an electrode forming surface in a third modification of the humidity sensor according to an aspect of the disclosure. FIG. 8 is a sectional view taken along line VIII-VIII in FIG. 7.

Referring to FIGS. 6 to 8, a humidity sensor 11 is configured such that the capacitance between first terminal T1 and second terminal T2 changes in accordance with humidity. The humidity sensor 11 is provided with the first electrode E1 electrically connected to the first terminal T1, and the moisture-sensitive member 2. The first electrode E1 includes a contact portion E1B serving as a contact to a terminal T1, and a first internal electrode unit E1A. The first internal electrode unit E1A has the first main surface S1 covered with the moisture-sensitive member 2, and the second main surface S2 covered with the moisture-sensitive member 2.

The humidity sensor 11 is further provided with the second electrode E2 electrically connected to the second terminal T2. The second electrode E2 includes: the second internal electrode unit E2A having the third main surface S3 covered with the moisture-sensitive member 2, and the fourth main surface S4 covered with the moisture-sensitive member 2; and the contact portion E1B serving as a contact to the terminal T1.

The moisture-sensitive member 2 includes a moisture-sensitive member 2D of a first layer, a moisture-sensitive member 2E of a second layer, and a moisture-sensitive member 2F of a third layer. The first internal electrode unit E1A is disposed between the moisture-sensitive member 2D of the first layer and the moisture-sensitive member 2E of the second layer. The second internal electrode unit E2A is disposed between the moisture-sensitive member 2E of the second layer and the moisture-sensitive member 2F of the third layer. The first electrode E1 is formed on the upper surface of the moisture-sensitive member 2D. The second electrode E2 is formed on the upper surface of the moisture-sensitive member 2E. Thereafter, the first electrode E1 is covered with the moisture-sensitive member 2E from above, and the second electrode E2 is covered with the moisture-sensitive member 2F. Finally, the moisture-sensitive members 2D, 2E, 2F are pressure-bonded and integrated. Note that the electrodes E1, E2 may be formed on the upper and lower surfaces of the moisture-sensitive member 2E, and then the moisture-sensitive member 2E may be sandwiched between the moisture-sensitive members 2D and 2F. The first electrode E1 is disposed on a first plane inside the moisture-sensitive member, and the second electrode E2 is disposed on a second plane inside the moisture-sensitive member parallel to the first plane.

The first internal electrode unit E1A faces at least a part of the second internal electrode unit E2A across the moisture-sensitive member 2 in the portion FP.

Figure 9:
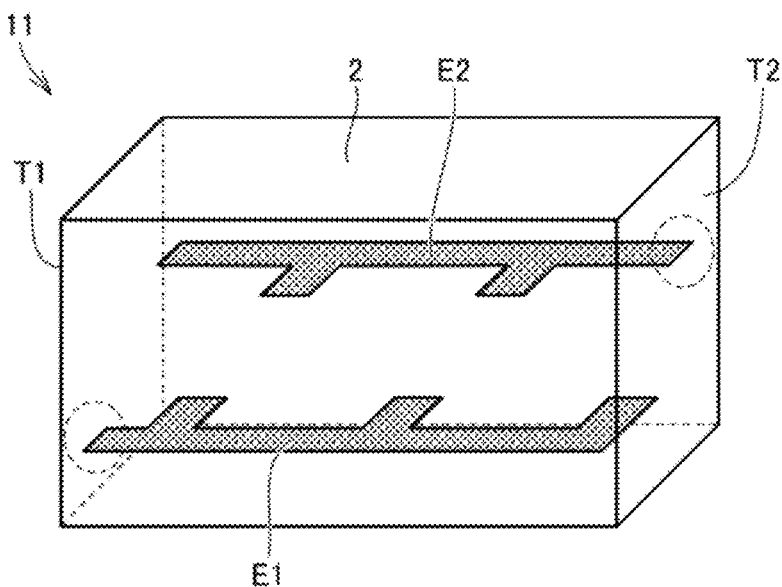
FIG. 9 is a perspective view showing a fourth modification of the humidity sensor in accordance with aspects of the present disclosure.
Figure 10:
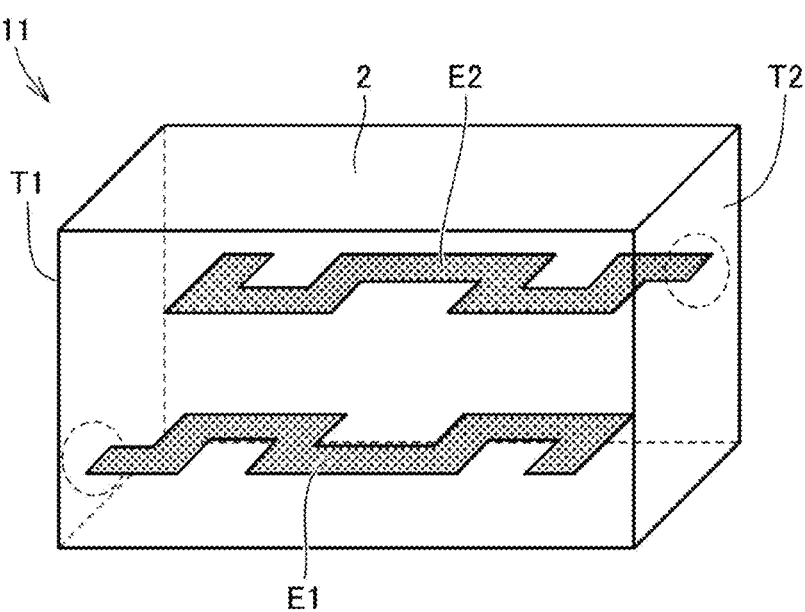
FIG. 10 is a perspective view showing a fifth modification of the humidity sensor in accordance with aspects of the present disclosure.

FIG. 9 is a perspective view showing a fourth modification of the humidity sensor according to an aspect of the disclosure. FIG. 10 is a perspective view showing a fifth modification of the humidity sensor according to an aspect of the disclosure. Even when the internal electrodes are formed on different planes, the internal electrodes may have the comb electrode shape shown in FIG. 9 or the meandering shape shown in FIG. 10 in addition to the flat plate shape shown in FIG. 6.

FIGS. 1 to 10 show the examples in which a humidity sensor element has a rectangular parallelepiped shape, but the humidity sensor element may have any shape such as a cube, bead, or cylinder. Further, a plurality of internal electrodes may be formed in the moisture-sensitive member.

According to the configuration of the humidity sensor in accordance with aspects of the disclosure described above, with the electrodes E1, E2 being inside the humidity sensor material, even when water droplets adhere to the surface of the humidity sensor material caused by dew condensation, a short circuit between the electrodes and an increase in the electrode area due to the adhesion of the water droplet may be prevented, and an influence on a measured value may be eliminated.

With the electrodes E1, E2 being inside the humidity sensor material, it is possible to prevent the corrosion of the electrodes by corrosive gas such as sulfur gas or nitrogen gas in the atmosphere. Therefore, the humidity may be measured without causing a deterioration in characteristics even in the presence of corrosive gas.

With the electrodes E1, E2 being inside the humidity sensor material, an area in which water molecules from the outside may be drawn to the humidity sensor material without being blocked by the electrodes becomes wider, and the sensitivity may be increased.

Further, when the internal electrodes E1, E2 are formed into the flat plate shape, the capacitance of the humidity sensor may be increased. When the internal electrodes E1, E2 are formed into the comb electrode shape or the meandering shape, the response and recovery speeds increase because the permeability of water molecules in the humidity sensor material is improved, although the capacitance is smaller than that in the case of the flat plate shape.

Next, a detailed description will be given of a specific example of a case where the internal electrode is a comb electrode, and polyimide is used as the humidity sensor material.

As the raw material of the polyimide, polyimide varnish, in which a polyamic acid is dissolved in an N-methyl-2 pyrrolidone (NMP) solvent, was used. The polyimide varnish is applied onto a PET film using a doctor blade having a thickness of 100 μm, and the sheet is moved while being dried at a temperature of 60° C. to form a polyimide precursor on the PET film. When the doctor blade having a thickness of 100 μm is used, the thickness of the sheet at this time is about 20 μm, and when the sheet thickness is desired to be further reduced, the thickness of the doctor blade may be reduced. For example, when a doctor blade having a thickness of 50 μm is used, a polyimide precursor sheet having a thickness of 10 μm may be formed.

After the polyimide precursor sheet is cut, Ag paste is printed on the polyimide precursor sheet by screen printing. The shape of the internal electrode may be changed by selecting a pattern to be printed from the flat plate shape, the comb shape, the meandering shape, and the like. After the printing, drying is performed in a dryer at 60° C. for five minutes. Although the Ag paste is used here, the type of the electrode material may be changed by using a paste of a material desired to be used as the internal electrode. The electrode may be prepared using a thin film forming process such as a sputtering method or a vapor deposition method.

Next, after the polyimide precursor sheet is removed from the PET film, a polyimide precursor sheet having the electrode printed thereon and a polyimide precursor sheet having no electrode printed thereon are laminated, a pressure of 200 MPa is applied for 60 seconds to bring the sheets into close contact with each other, and then, the sheets are cut in accordance with the electrode pattern. After the cutting, firing is performed in an air atmosphere at 350° C. for one hour.

After an Ag extended electrode is formed on the fired sample, the sample is fired at 100° C. to complete preparation of a target humidity sensor element.

As described in the above example, the polyimide precursor sheet having no electrode printed thereon and the polyimide precursor sheet having no electrode printed thereon are used one by one. In another example, when an arbitrary number of sheets are laminated using only sheets having the electrodes printed thereon, a laminated structure in which the internal electrodes are disposed at equal intervals may be prepared. It is also possible to prepare one including various electrode patterns by changing the types of electrode patterns to be laminated. The distance between the electrodes may be adjusted by inserting the sheet having no electrode printed thereon.

Figure 11:
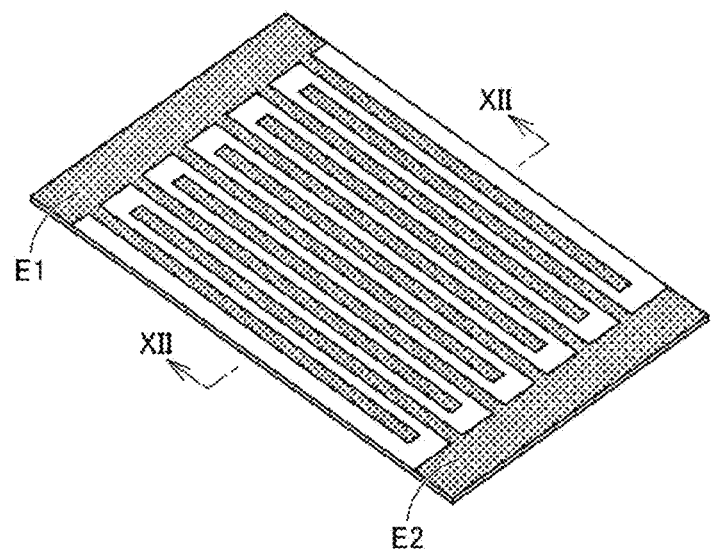
FIG. 11 is a view showing an electrode shape of a specific example in a case where the electrode is a comb electrode.
Figure 12:
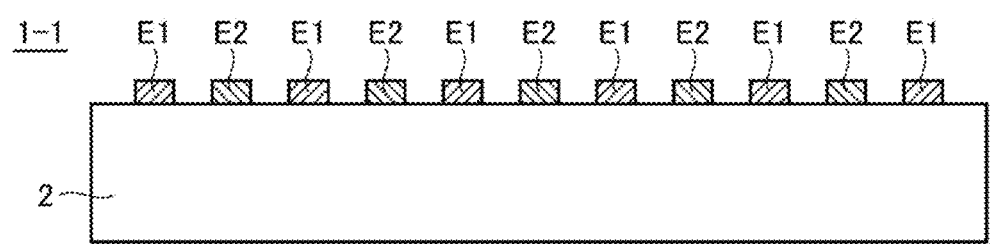
FIG. 12 is a sectional view of a sensor element (1-1) as a comparative example.
Figure 13:
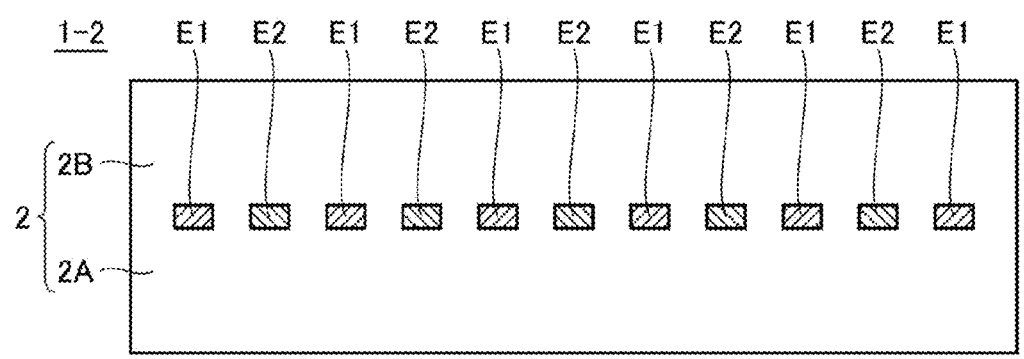
FIG. 13 is a sectional view of a sensor element (1-2) as an example in accordance with aspects of the present disclosure.

FIG. 11 is a diagram showing an electrode shape of a specific example of the c case where the electrode is the comb electrode. A comparison is made in capacitance between two sensors each including the electrode shown in FIG. 11. FIG. 12 is a sectional view of a sensor element (1-1) as a comparative example. FIG. 13 is a sectional view of a sensor element (1-2) according to an aspect of the disclosure.

The sensor element (1-1) shown in FIG. 12 is formed by disposing electrodes at a line/space (L/S) (line/space)=50 μm/50 μm as shown in FIG. 11 on a precursor sheet of a first-layer polyimide sheet (length×width×height=1.2 mm×2.0 mm×15 μm) having a size of 1.2 mm long by 2.0 mm wide and a thickness of 15 μm. One exemplary aspect of the disclosure includes the capacitance of the sensor element (1-1) at 0.776 pF at 1 MHz and 10% RH.

On the other hand, the sensor element (1-2) shown in FIG. 13 is formed by laminating a 15 μm polyimide sheet on the electrode having the structure shown in FIG. 12 and has the structure of the humidity sensor according to an aspect of the disclosure. The first electrode E1 of the sensor element (1-2) includes a plurality of internal electrode units branched from a portion connected to the terminal T1. The second electrode E2 of the sensor element (1-2) includes a plurality of internal electrode units branched from a portion connected to the terminal T2. The moisture-sensitive member 2 includes the moisture-sensitive member 2A of the first layer, and the moisture-sensitive member 2B of the second layer that is disposed so as to be at least partially in contact with the moisture-sensitive member 2A of the first layer. The plurality of branched internal electrode units of the first electrode E1 and the second electrode E2 are disposed between the moisture-sensitive member 2A of the first layer and the moisture-sensitive member 2B of the second layer. The plurality of internal electrode units of the first electrode E1 and the plurality of internal electrode units of the second electrode E2 are both disposed on one plane inside the moisture-sensitive member. One exemplary aspect of the disclosure includes the capacitance of the sensor element (1-2) at 1.321 pF at 1 MHz and 10% RH, and it was found that the capacitance was approximately 1.7 times larger than that of the sensor element (1-1) in which the electrode is exposed to the outside. By increasing the capacitance in this manner, the influence of external factors, such as a parasitic capacitance of a measurement circuit, may be reduced.

Further, by constituting an LC parallel resonance circuit with an inductor in which the inductance of the sensor element (1-2) is externally connected to the sensor element (1-2), a resonance frequency $f(=1/(2\pi(LC)))$ may be lowered by about 1.3 times.

Figure 14:
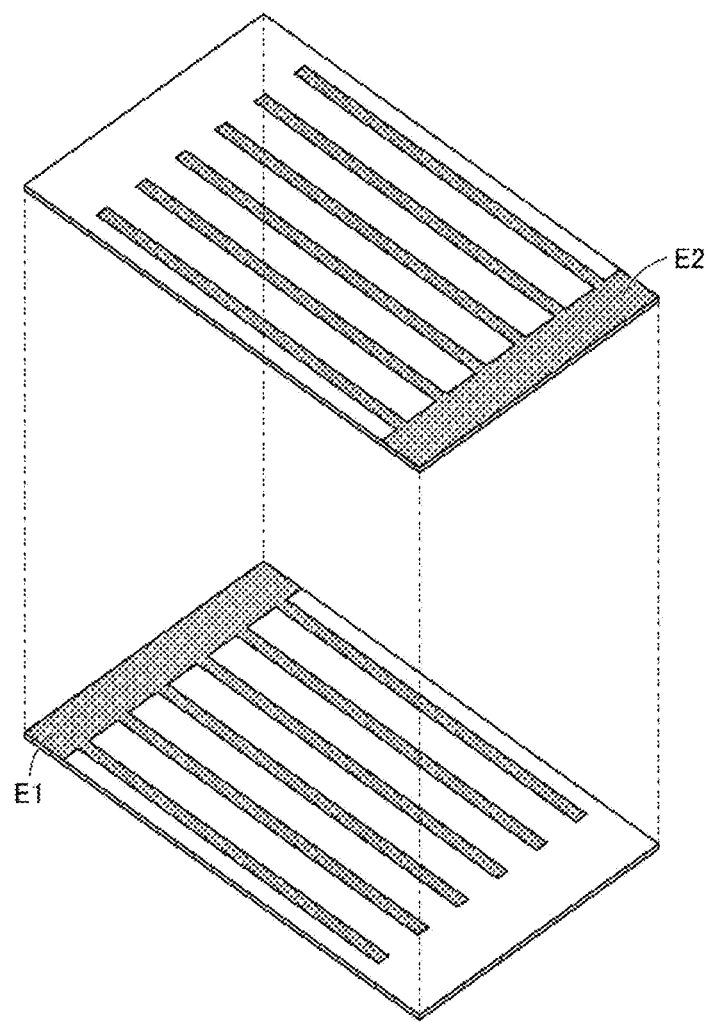
FIG. 14 is a view showing an electrode shape in the case of lamination.
Figure 15:
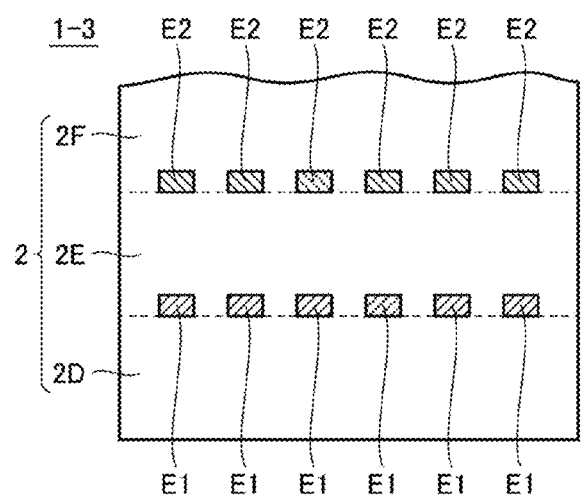
FIG. 15 is a partial sectional view of a sensor element (1-3) as another example in accordance with aspects of the present disclosure.

Further, when many polyimide sheets having comb electrodes printed thereon are laminated, a larger capacitance may be obtained. FIG. 14 is a view showing an electrode shape in the case of lamination. FIG. 15 is a partial sectional view of a sensor element (1-3) as another example according to an aspect of the disclosure. As is seen from the sectional view shown in FIG. 15, the plurality of internal electrode units of the first electrode E1 are disposed on one plane inside the moisture-sensitive member. The plurality of internal electrode units of the second electrode E2 are disposed on another plane inside the moisture-sensitive member.

The sensor element (1-3) is formed by alternately laminating 73 layers of polyimide sheets having the comb electrodes printed thereon as shown in FIG. 14 (polyimide sheets with the top having no electrode) to have the Japanese Industrial Standard (JIS) 2012 size (2.0 mm×1.2 mm). One exemplary aspect of the disclosure includes a capacitance of the sensor element (1-3) at 104.301 pF, which is about 79 times larger than that of the sensor element (1-2), and the resonance frequency may be made about 8.9 times lower.

Figure 16:
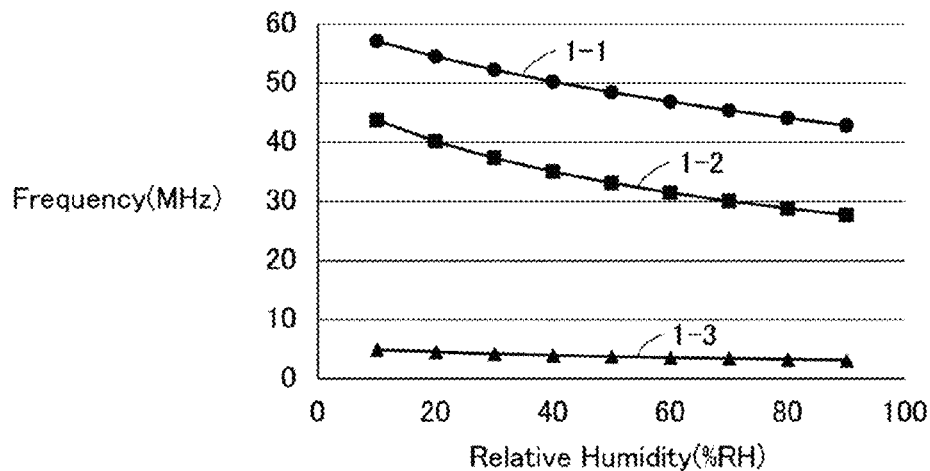
FIG. 16 is a diagram showing the relationship between humidity and a resonance frequency of each sensor element.
Figure 17:
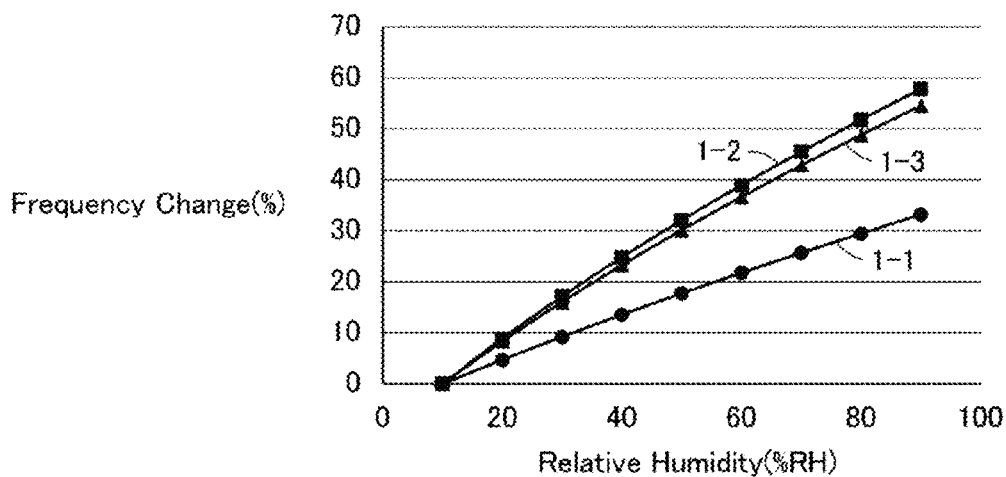
FIG. 17 is a diagram showing the relationship between the humidity and the rate of change in the resonance frequency of each sensor element.

FIG. 16 is a diagram showing the relationship between the humidity and the resonance frequency of each sensor element. FIG. 17 is a diagram showing the relationship between the humidity and the rate of change in the resonance frequency of each sensor element.

FIG. 16 shows how the resonance frequency changes due to humidity when a resonance circuit is formed by combining the sensor elements (1-1), (1-2), (1-3) with a 10 pH inductor. FIG. 17 shows the relationship between the humidity and the rate of change in resonance frequency when a case where the humidity is 10% RH is taken as a reference (0%). The results shown in FIGS. 16 and 17 are exemplary results.

As illustrated in FIG. 16 each of the sensor elements (1-2), (1-3), according to an aspect of the disclosure, the resonance frequency may be made lower than that in the sensor element (1-1) of the comparative example. Thus, the choice of the microcomputer to be used in modularization may be increased. Further, as illustrated in FIG. 17 each of the sensor elements (1-2), (1-3) according to an aspect of the disclosure, the sensitivity may be made higher than that in the sensor element (1-1) of the comparative example. The reason for this is considered to be that the use of the electrode as the internal electrode leads to an increase in the proportion of the moisture-sensitive material around the electrode.

Figure 18:
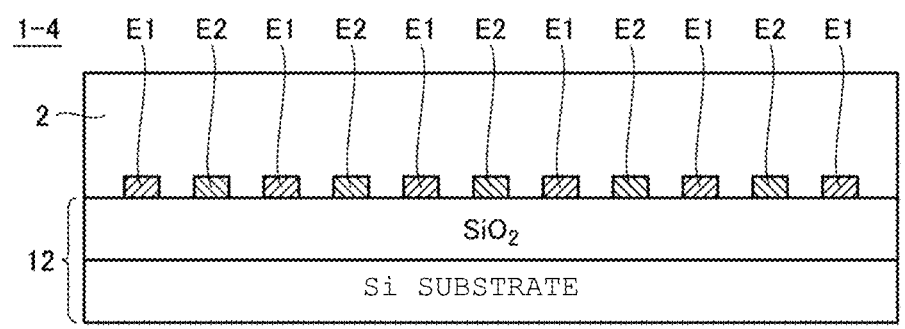
FIG. 18 is a sectional view showing a cross section of a sensor element (1-4) as a comparative example.

FIG. 18 is a sectional view showing a cross section of a sensor element (1-4) as a comparative example. In the sensor element (1-4), a pair of comb electrodes E1, E2 similar to those shown in FIG. 11 are disposed on a $SiO_2$/Si substrate 12, and the moisture-sensitive member 2 is disposed so as to cover the electrode. The sensor element (1-4) may be prepared as follows.

First, polyimide varnish may be applied on a $SiO_2$/Si substrate by spin coating and dried at 130° C. for ten minutes. Then, a film of an Al electrode may be formed to have a thickness of 100 nm by vapor deposition. Thereafter, firing may be performed in an air atmosphere at 350° C. for one hour. Further, a sensor element (1-4) having a size of 1.2 mm in length, 2.0 mm in width, and 15 μm in polyimide thickness may be prepared on the $SiO_2$/Si substrate through processes of resist coating, $O_2$ plasma etching, and resist peeling. The capacitance of the sensor element (1-4) as thus prepared was measured to be 1.702 pF, which is larger than the capacitance of the sensor element (1-2) of 1.321 pF. However, the capacitance also includes a capacitance component that is derived from $SiO_2$ and with which the comb electrode is in contact. The total capacitance of the sensor element (1-4) is made up of a component derived from polyimide and in contact with the upper surface of the electrode and the capacitance component derived from $SiO_2$ and in contact with the lower surface of the electrode. Of the capacitance, the capacitance component derived from $SiO_2$ does not change due to a change in humidity. The rate of change in capacitance when the change in humidity is low as compared to that of the sensor element (1-2) according to an aspect of the disclosure and having the same placement of the electrodes.

Figures 19, 20:
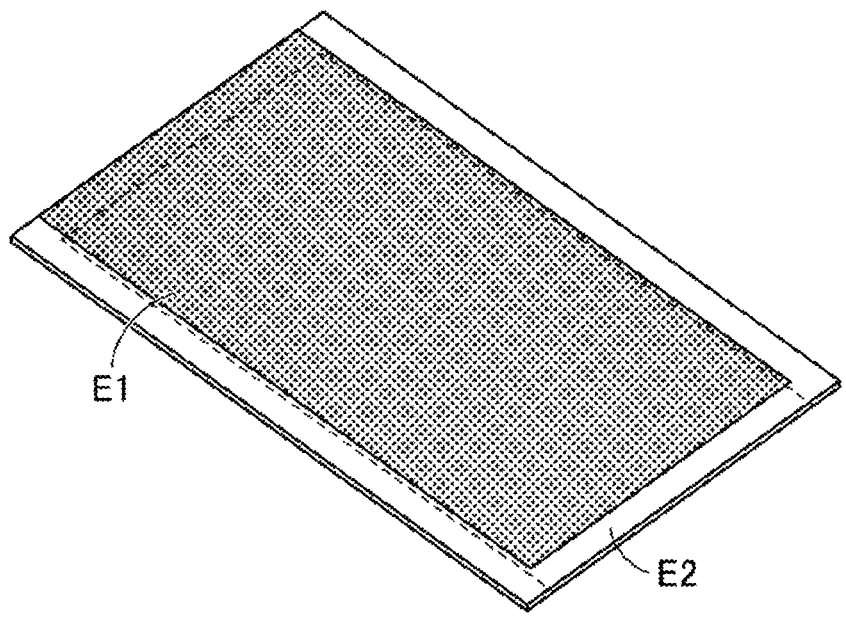
FIG. 19 is a diagram summarizing and showing the changes in the capacitance of the sensor element in accordance with aspects of the present disclosure and the comparative example.
FIG. 20 is a view showing an electrode shape of a specific example when the electrode is a flat plate.

FIG. 19 is a diagram summarizing and showing the changes in the capacitance of the sensor element according to an aspect of the disclosure and the comparative example. When a comparison was made in the response to the change in humidity, in the sensor element (1-2) according to an aspect of the disclosure, the rate of change in capacitance was 149.2% when the relative humidity changed from 10% to 90%, whereas in the sensor element (1-4) of the comparative example, the rate of change was 35.3%. That is, it is seen that the sensor element (1-2) according to an aspect of the disclosure in which the periphery of the electrode is entirely made of polyimide has higher sensitivity than the sensor element (1-4) of the comparative example.

FIG. 20 is a view showing an electrode shape of a specific example when the electrode is the flat plate. A comparison is made in capacitance between two sensors each including the electrode shown in FIG. 20.

A sensor element formed by forming the electrodes E1, E2 on both surfaces of a sheet made of polyimide is taken as a sensor element (1-5) of a comparative example, and a sensor element formed by further pressure-bonding the polyimide sheet from above and below so as to cover the surfaces of the electrodes E1, E2 of the sensor element (1-5) is taken as a sensor element (1-6) according to an aspect of the disclosure.

Figures 21, 22:
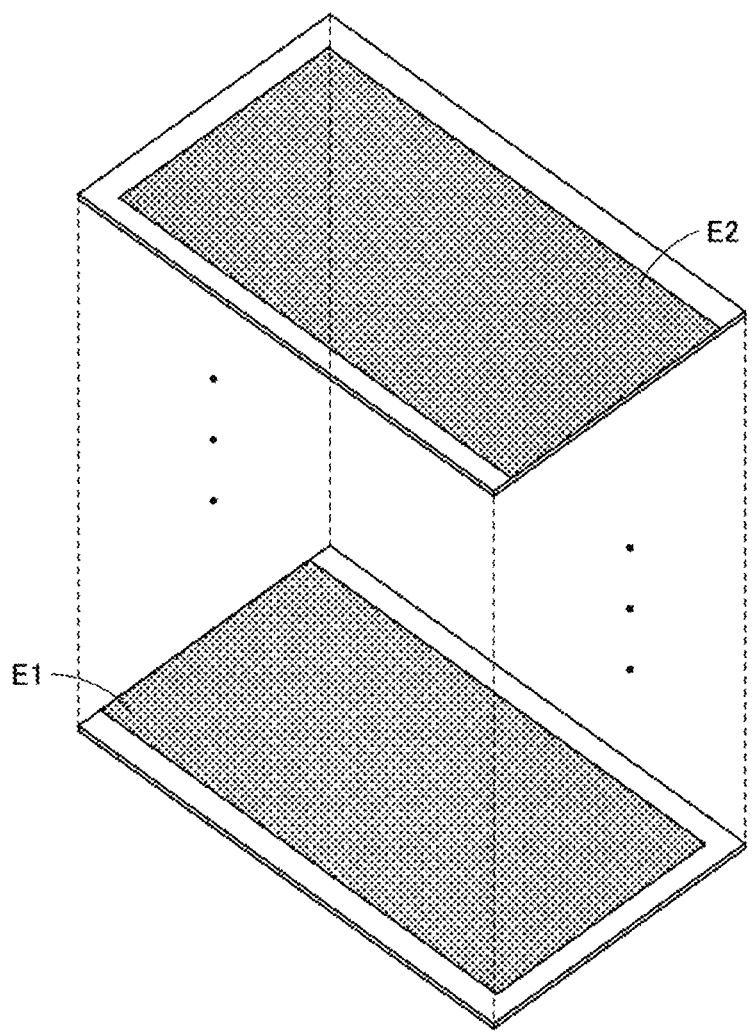
FIG. 21 is a view showing a state where polyimide sheets each having an electrodes E1 formed thereon and polyimide sheets each having an electrode E2 formed thereon are laminated alternately.
FIG. 22 is a diagram showing a comparison in capacitance among sensor elements (1-5), (1-6), (1-7)

In addition, a case where multilayered electrodes are laminated is also examined in the same manner. FIG. 21 is a view showing a state where polyimide sheets each having an electrodes E1 formed thereon and polyimide sheets each having an electrode E2 formed thereon are laminated alternately. A sensor element formed by laminating 73 layers of electrodes (polyimide sheets with the top having no electrode) to have a size of 2.0 mm×1.2 mm×1.2 mm is taken as a sensor element (1-7) according to an aspect of the disclosure. With such a configuration, the plurality of internal electrode units of the first electrode E1 are respectively disposed on a plurality of planes parallel to each other inside the moisture-sensitive member. The plurality of internal electrode units of the second electrode E2 are also respectively disposed on a plurality of planes parallel to each other inside the moisture-sensitive member.

FIG. 22 is a diagram showing a comparison in capacitance among the sensor elements (1-5), (1-6), (1-7). The capacitance of the sensor element (1-5) of the comparative example is 3.697 pF. In contrast, it is seen that in the sensor element (1-6) according to an aspect of the disclosure in which the upper and lower surfaces of the electrodes are covered with polyimide, the capacitance is 3.780 pF, which is larger than the capacitance of the sensor element (1-5), and in the sensor element (1-7), the capacitance is even larger at 257.843 pF.

Figure 23:
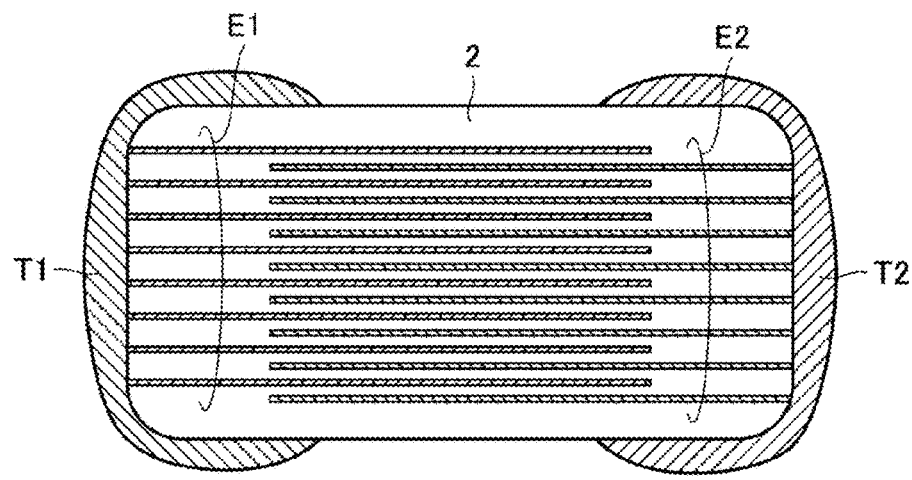
FIG. 23 is a view showing a first example of the laminated arrangement of the electrodes.
Figure 24:
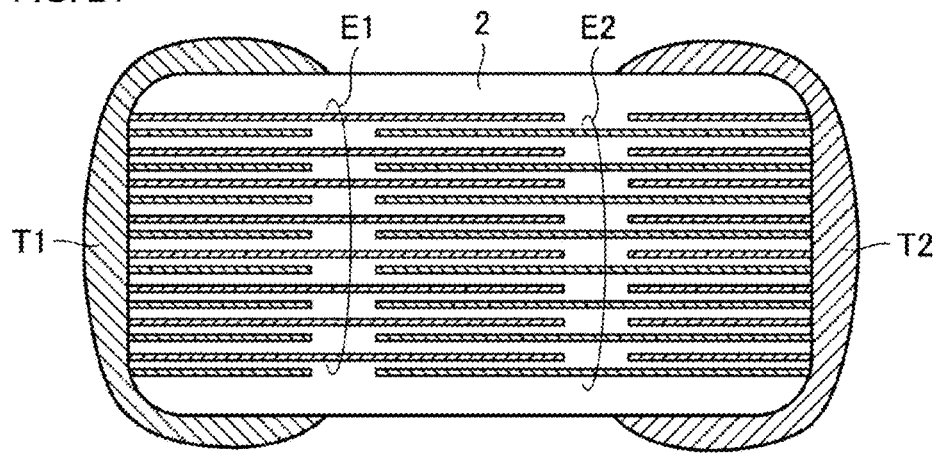
FIG. 24 is a view showing a second example of the laminated arrangement of the electrodes.
Figure 25:
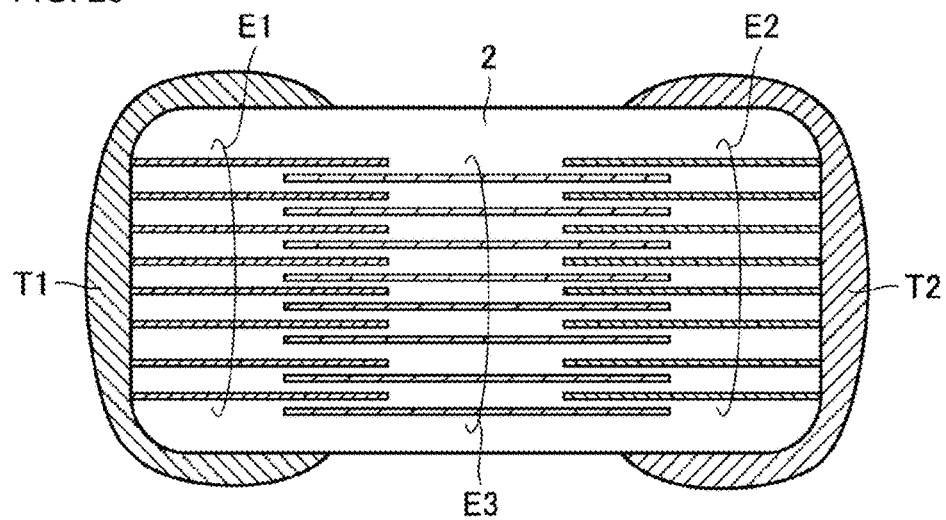
FIG. 25 is a view showing a third example of the laminated arrangement of the electrodes.

The sensor element (1-7) has the same shape as a general multilayer ceramic capacitor. In the humidity sensor according to an aspect of the disclosure, it is possible to adopt various arrangements of internal electrodes similar to those of the multilayer ceramic capacitor. There are many degrees of freedom in the arrangement of the internal electrodes. FIG. 23 is a view showing a first example of the laminated arrangement of the electrodes. FIG. 24 is a view showing a second example of the laminated arrangement of the electrodes. FIG. 25 is a view showing a third example of the laminated arrangement of the electrodes.

For example, the internal electrode structure shown in FIGS. 23 to 25, as is generally known for the multilayer ceramic capacitor, may be employed. The arrangement shown in FIG. 23 is a typical electrode arrangement. The arrangement shown in FIG. 24 is an electrode arrangement in which the electrodes E1, E2 are alternately laminated in the center portion. In this case, a counter electrode electrically connected to the terminal T2 is formed with a space from each electrode E1 on the layer where the electrode E1 electrically connected to the terminal T1 is formed, and a counter electrode electrically connected to the terminal T1 with a space from each electrode E2 is formed on the layer where the electrode E2 electrically connected to the terminal T2 is formed. In the arrangement shown in FIG. 25, an electrode E3 is disposed between the electrodes E1, E2. An equivalent circuit of the sensor element of this arrangement is a circuit in which a parallel plate capacitor formed of the electrodes E1, E3 and a parallel plate capacitor formed of electrodes E2, E3 are connected in series. In the humidity sensor as shown in FIGS. 21, 23, and 25, the moisture-sensitive member 2 includes a plurality of moisture-sensitive layers that are disposed such that at least a part of the layers are in contact with each other, and the plurality of internal electrode units of the first electrode E1 are alternately laminated with the plurality of moisture-sensitive layers. The plurality of internal electrode units of the second electrode E2 are also alternately laminated with the plurality of moisture-sensitive layers.

By forming the plurality of layers of internal electrodes in this manner, the capacitance may be further increased. In this case, various internal electrode shapes may be combined. When various internal electrode shapes are combined, a humidity sensor with high capacitance and fast response and recovery speeds may be prepared by disposing the flat plate-shaped electrode in the center part of the element and disposing the comb electrode-shaped or meandering-shaped electrode or some other electrode outside the element.

Further, in the structure of the humidity sensor according to an aspect of the disclosure, the electrodes are disposed in a state where the electrodes are embedded inside the moisture-sensitive member, so that the influence of electrode corrosion due to corrosive gas may be reduced. By a method according to Japanese Industrial Standards (JIS) K 7126, gas permeabilities of $SO_2$, $NH_3$, and $H_2S$, which are typical corrosive gases, were measured to be $2.39 \times 10^{-13}$ mol/($s \cdot m^2 \cdot Pa$), $1.26 \times 10^{-13}$ mol/($s \cdot m^2 \cdot Pa$), and $5.02 \times 10^{-14}$ mol/($s \cdot m^2 \cdot Pa$), respectively, for a polyimide sheet having a thickness of 15 μm. Considering that corrosive gas is directly exposed to the electrode in the case of the external electrode, it is understood that the internal electrode has a certain gas permeation reducing effect on each corrosive gas. It is thus understood that the resistance to gas corrosion is improved as compared to when the electrode is directly opened to the atmosphere.

In the humidity sensor according to an aspect of the disclosure, the electrodes E1, E2 have been connected to the terminals T1, T2, respectively, and the electrodes E1, E2 have been covered with the moisture-sensitive material. In a humidity sensor according to an aspect of the disclosure, a coil-shaped internal electrode is formed between terminals T1, T2, and the internal electrode is covered with a moisture-sensitive material.

Figure 26:
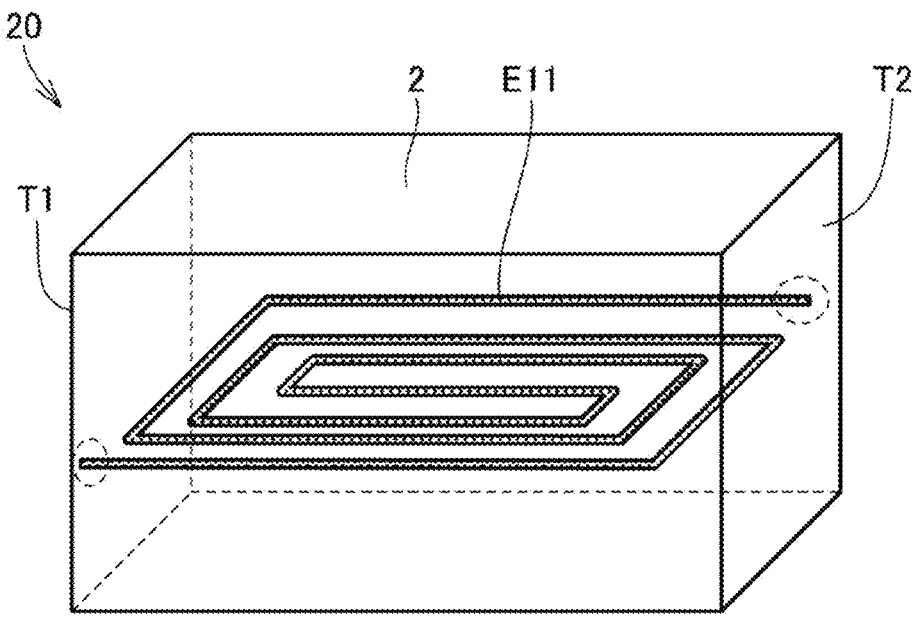
FIG. 26 is a perspective view showing a configuration of a first example of a humidity sensor in accordance with aspects of the present disclosure.
Figure 27:
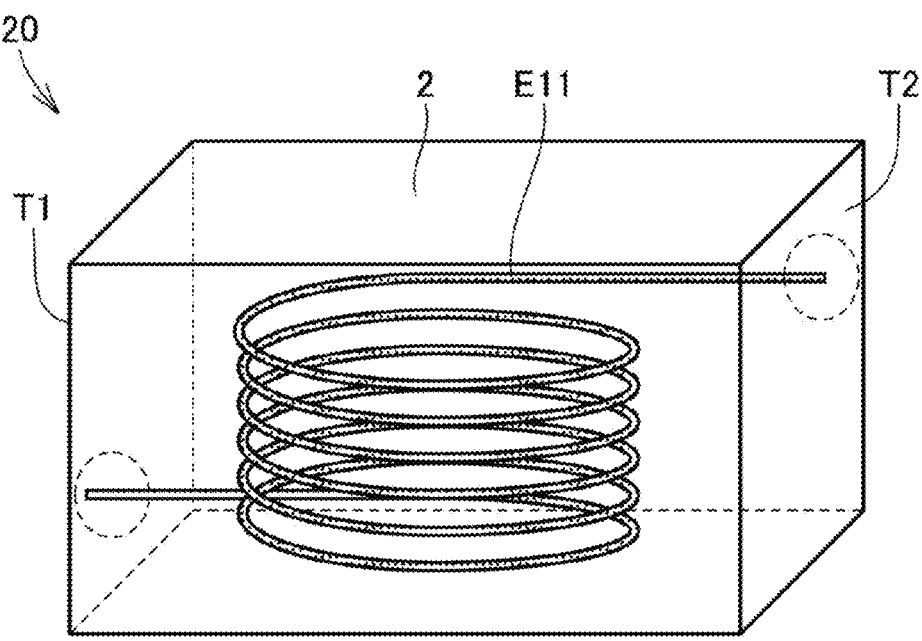
FIG. 27 is a perspective view showing a configuration of a second example of the humidity sensor in accordance with aspects of the present disclosure.
Figure 28:
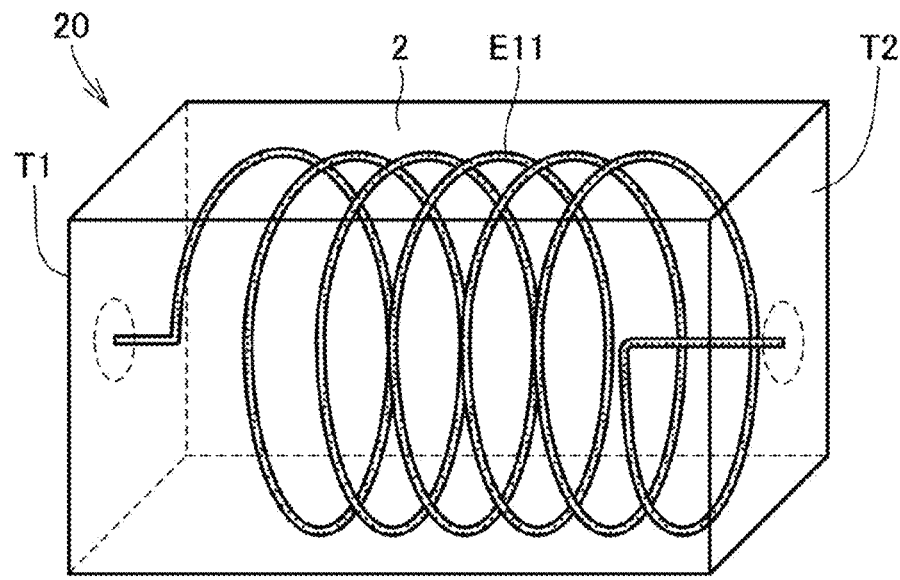
FIG. 28 is a perspective view showing a configuration of a third example of the humidity sensor in accordance with aspects of the present disclosure.

FIG. 26 is a perspective view showing a configuration of a first example of the humidity sensor according to an aspect of the disclosure. FIG. 27 is a perspective view showing a configuration of a second example of the humidity sensor according to an aspect of the disclosure. FIG. 28 is a perspective view showing a configuration of a third example of the humidity sensor according to an aspect of the disclosure.

In the examples shown in FIGS. 26 to 28, an internal electrode E11 has a coil shape, and both ends of the internal electrode E11 are connected to the terminals T1, T2. The coil may be on the same plane as shown in FIG. 26 or may be three-dimensional as shown in FIGS. 27 and 28. In the case of the three-dimensional coil, its shape is horizontal winding (FIG. 27), vertical winding (FIG. 28), oblique winding, and the like. Further, a plurality of coils may be provided inside the humidity sensor material.

Figure 29:
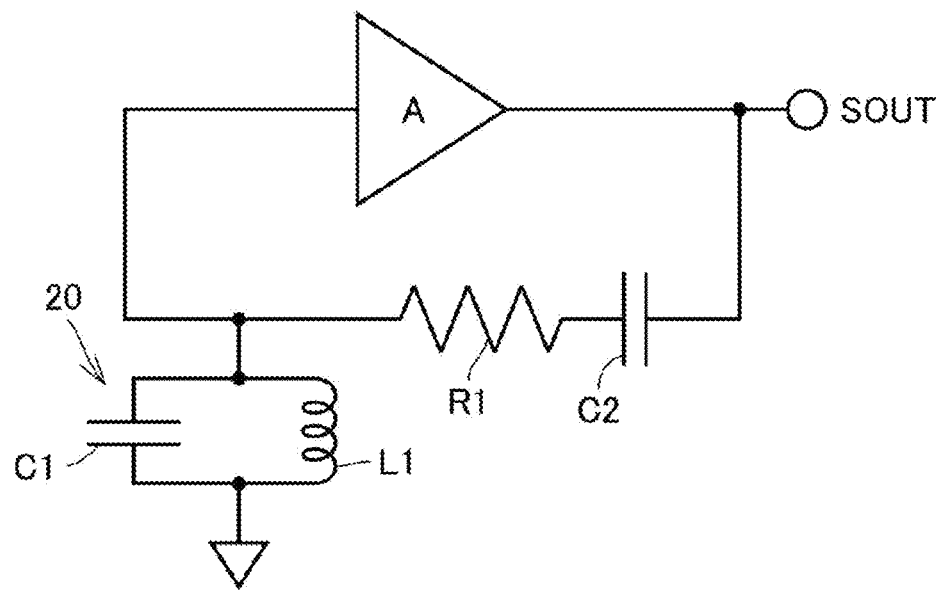
FIG. 29 is a diagram showing an example of a resonance circuit incorporating the humidity sensor.

FIG. 29 is a diagram showing an example of a resonance circuit incorporating the humidity sensor. A capacitor C2 and a resistor R are connected in series between an output and an input of an amplifier element A, and a coil L and a capacitor C1 are connected in parallel between the input and the ground of the amplifier element. The parallel-connected portion of the coil L and the capacitor C1 is an equivalent circuit corresponding to the humidity sensor shown in FIGS. 26 to 28. The inductance of the coil L hardly changes due to a change in humidity, and the capacitance of the capacitor C1 changes in accordance with the amount of change in humidity. Hence the humidity may be detected using the change in resonance frequency.

Figure 30:
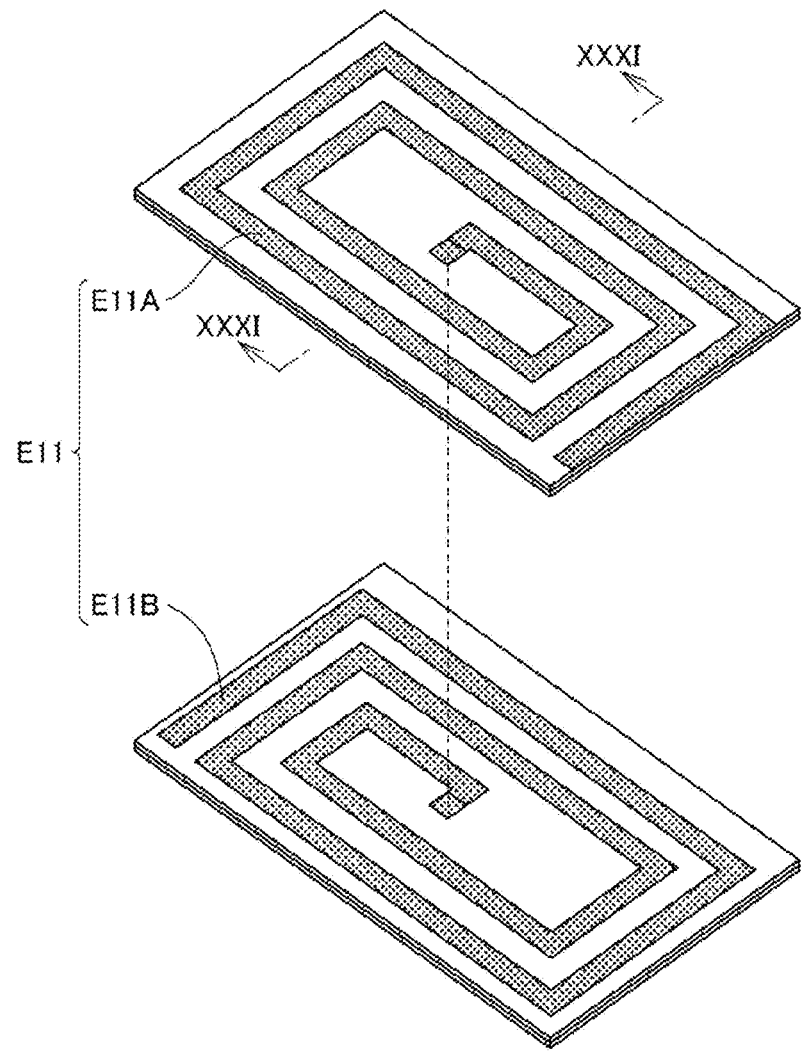
FIG. 30 is a view showing an example of the shape of the planar coil-shaped electrode.

As an example, a case of a planar coil-shaped electrode will be described. FIG. 30 is a diagram showing an example of the shape of the planar coil-shaped electrode. As shown in FIG. 30, a structure is examined in which in a size of 1.2 mm×2.0 mm in length×width, a planar coil-shaped upper electrode with an L/S of 100 μm/100 μm and a planar coil-shaped lower electrode are connected through a via at the center part.

Figure 31:
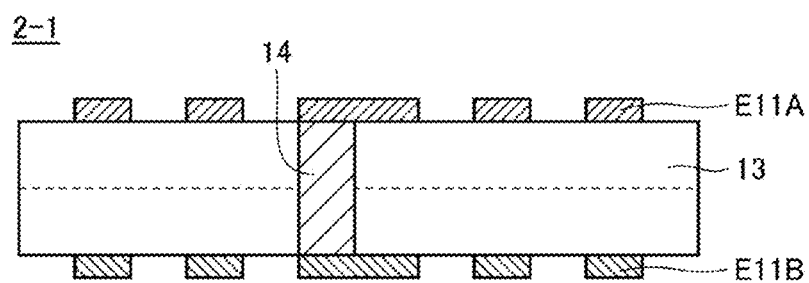
FIG. 31 is a sectional view showing a configuration of a sensor element (2-1) of a comparative example.
Figure 32:
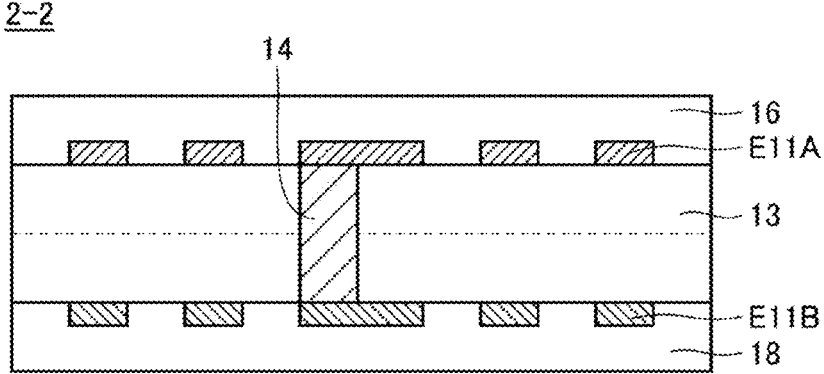
FIG. 32 is a sectional view showing a configuration of a sensor element (2-2) in accordance with aspects of the present disclosure.

FIG. 31 is a sectional view showing a configuration of a sensor element (2-1) of a comparative example. The sensor element (2-1) is constituted by sandwiching a polyimide sheet 13 between an upper electrode E11A and a lower electrode E11B from above and below. FIG. 32 is a sectional view showing a configuration of a sensor element (2-2) according to an aspect of the disclosure. The sensor element (2-2) is formed by further covering the upper and lower surfaces of the sensor element (2-1) with polyimide sheets 16, 18. The sensor element (2-1) has a structure similar in the sense that the electrodes E11A, E11B—exposed to the outside.

The sensor element (2-1) may be prepared by the following method. A polyimide precursor sheet is prepared by the method described according to an aspect of the disclosure, and a via 14 is opened using a laser puncher. After the opening of the via, Ag paste is poured into the via 14 and dried at 60° C., and then coil-shaped Ag electrodes E11A, E11B are formed on both sides by printing. Drying may be performed at 60° C. for every single-side printing. Cutting is performed into a target size, and then firing is performed under an air atmosphere at 350° C. for one hour. After an Ag extended electrode (not shown) is formed on the fired sample, the sample is fired at 100° C., to complete preparation of a target sensor element. For example, where the resonance frequency of the sensor element (2-1) of the comparative example prepared in this manner was 8.039 GHz.

On the other hand, when polyimide sheets having a thickness of 15 μm are laminated above and below the sensor element (2-1), the sensor element (2-2) may be prepared. The polyimide precursor sheet after the printing of the electrodes E11A, E11B in the preparation process of the sensor element (2-1) shown in FIG. 31 is sandwiched between the polyimide sheets 16, 18 having no electrodes printed thereon as shown in FIG. 32. After the polyimide sheets 13, 16, 18 are pressure-bonded at a pressure of 200 MPa, firing is performed at 350° C. for one hour in an air atmosphere. Thus, the sensor element (2-2) may be prepared. For example, the resonance frequency of the sensor element (2-2) was 5.927 GHz, and it was found that the resonance frequency may be lowered as compared to the sensor element (2-1) of the comparative example. The reason for this is considered to be that the capacitance of the sensor element (2-2) has become larger than that of the sensor element (2-1).

Figure 33:
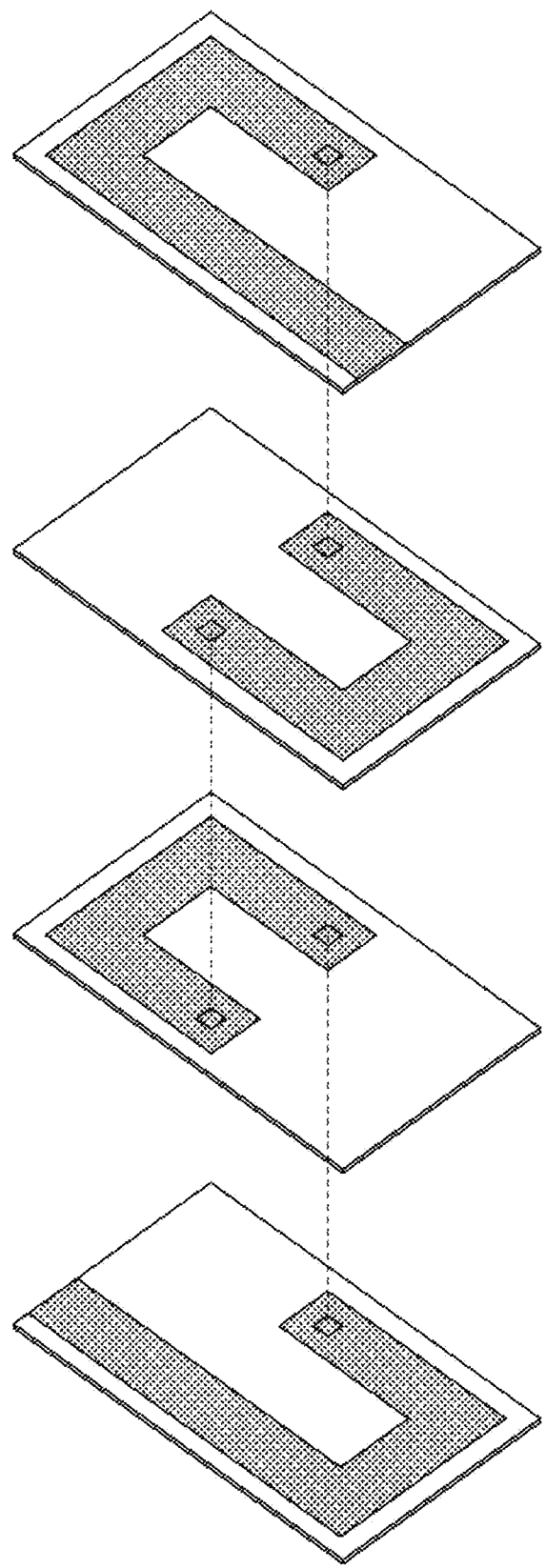
FIG. 33 is a view showing the connection of electrodes of a sensor element (2-3) in which a three-dimensional coil is formed inside the element.

Further, a three-dimensional coil may be formed inside the element like a general chip inductor. FIG. 33 is a view showing the connection of electrodes of a sensor element (2-3) in which a three-dimensional coil is formed inside the element. In such a sensor element (2-3), the resonance frequency may be further lowered.

The sensor element (2-3) may be prepared, as in the cases of the sensor element (2-1) and the sensor element (2-2), by opening a via in the polyimide precursor sheet, pouring Ag paste, printing an Ag electrode, and laminating 73 sheets in total.

Figures 34, 35:
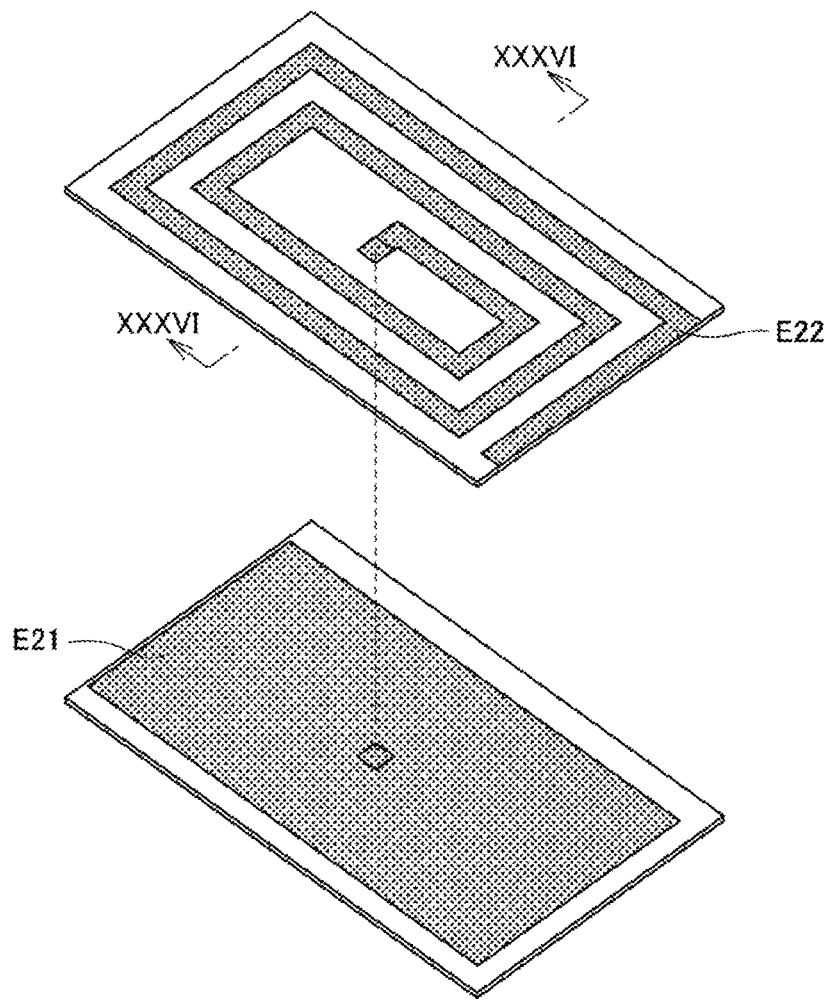
FIG. 34 is a diagram showing a comparison in resonance frequency among the sensor elements (2-1), (2-2), (2-3)
FIG. 35 is a view showing an example of the shape of an electrode formed by combining a flat plate shape and a planar coil-shaped electrode.

FIG. 34 is a diagram showing a comparison in resonance frequency among the sensor elements (2-1), (2-2), (2-3). The resonance frequency of the sensor element (2-3) is 0.727 GHz, the resonance frequency of the sensor element (2-2) is 5.927 GHz, and it is understood that the resonance frequencies of these sensor elements may be significantly lowered as compared to that of the sensor element (2-1).

According to the humidity sensor according to an aspect of the disclosure, the inductance may be increased. Therefore, when the change in humidity is measured with the LC resonance circuit, the LC resonance frequency may be lowered by increasing the inductance or the capacitance. Hence a microcomputer with a low clock frequency may also be used, so that the degree of freedom of the microcomputer increases, and the microcomputer may be made less susceptible to a characteristic change due to disturbance such as a parasitic capacitance or a parasitic inductance.

A humidity sensor according to an aspect of the disclosure is a combination of the internal electrode having the flat plate shape, comb shape, meandering shape, etc., and the internal electrode having the coil shape.

The humidity sensor according to an aspect of the disclosure, both the capacitance and inductance may be increased. Therefore, when the measurement is performed by the LC resonance circuit, the LC resonance frequency may be lowered by increasing the inductance or the capacitance. A microcomputer having a low clock frequency may also be used, so that the degree of freedom of the microcomputer increases, and the microcomputer may be made less susceptible to a characteristic change due to disturbance such as a parasitic capacitance or a parasitic inductance.

As an example, a case where a flat plate shaped electrode and a planar coil-shaped electrode are combined will be described. FIG. 35 is a view showing an example of the shape of an electrode formed by combining the electrode on the flat plate and the planar coil-shaped electrode. As shown in FIG. 35, in a size of 1.2 mm×2.0 mm in length×width, a planar coil-shaped electrode having an L/S of 100 μm/100 μm is connected to an electrode on the flat plate on the lower side thereof through a via at the center part. FIG. 36 is a sectional view showing a configuration of a sensor element (3-1) as a comparative example. The sensor element (3-1) may be prepared by the following method. In the same manner as an aspect of the disclosure, a polyimide precursor sheet 22 is prepared, and a via 24 is opened using a laser puncher. After the opening of the via, Ag paste is poured into the via and dried at 60° C., and then an Ag electrode E21 on a flat plate is formed on one side, while a coil-shaped Ag electrode E22 is formed on another side, by printing. Drying may be performed at 60° C. for every single-side printing. Thereafter, firing is performed in an air atmosphere at 350° C. for one hour.

FIG. 37 is a sectional view showing a configuration of a sensor element (3-2) according to an aspect of the disclosure. The sensor element (3-2) shown in FIG. 37 is formed by sandwiching the upper and lower sides of the sensor element (3-1) by polyimide having a thickness of 15 μm. The sensor element (3-2) may be prepared by the following: the polyimide precursor sheet 22 after the electrode printing in the preparation process of the sensor element (3-1) is sandwiched between polyimide sheets 26, 28 having no electrodes printed thereon, which is pressure-bonded with a pressure of 200 MPa, cut into a target size, and fired at 350° C. for one hour in an air atmosphere.

FIG. 38 is a diagram showing a comparison in resonance frequency between the sensor elements (3-1), (3-2). As shown in FIG. 38, the resonance frequency of the sensor element (3-1) was 11.660 GHz. The resonance frequency of the sensor element (3-2) was 10.210 GHz. In the sensor element (3-2) in which the electrode is covered with the moisture-sensitive material, it was possible to lower the resonance frequency as compared to the sensor element (3-1) in which the electrode is exposed. The reason for this is considered to be that the capacitance of the sensor element (3-2) has become larger than that of the sensor element (3-1).

A humidity sensor according to an aspect of the disclosure is further provided with an external electrode on at least one of the surfaces of the element in addition to the configuration of the moisture-sensitive sensor of any of aspects described above.

Figure 40:
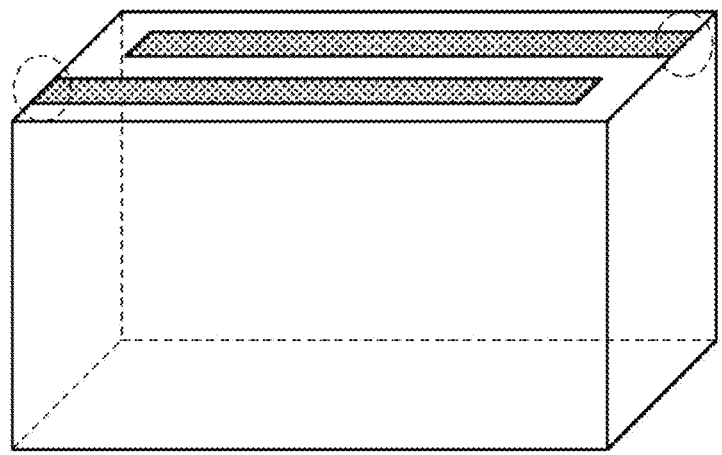
FIG. 40 is a view showing a second example of the shape of the external electrode in the moisture-sensitive sensor in accordance with aspects of the present disclosure.
Figure 41:
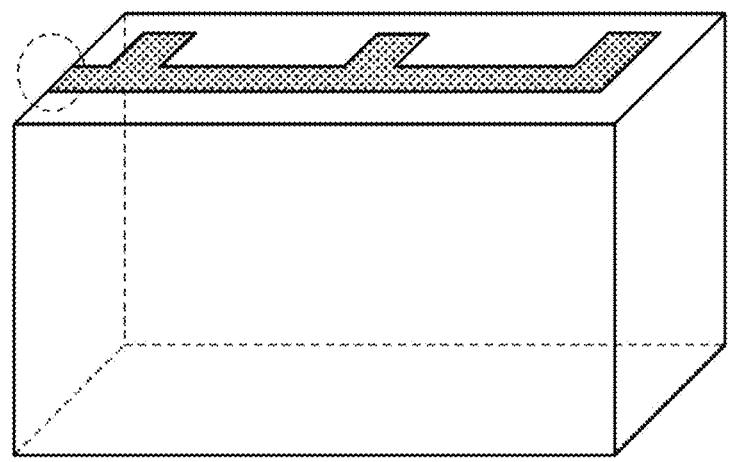
FIG. 41 is a view showing a third example of the shape of the external electrode in the moisture-sensitive sensor in accordance with aspects of the present disclosure.
Figure 42:
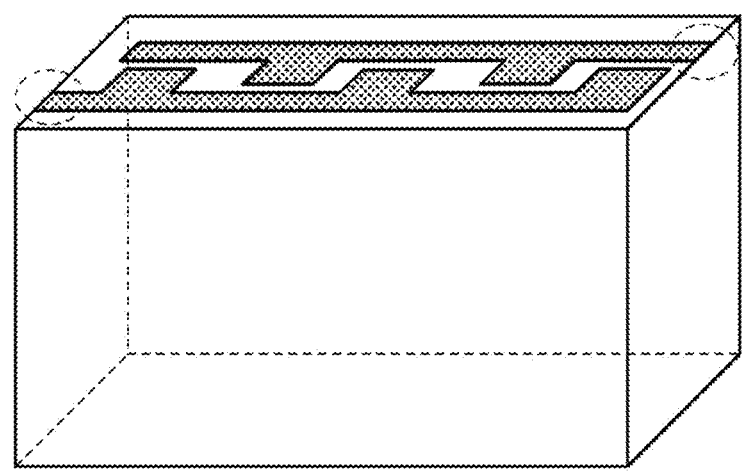
FIG. 42 is a view showing a fourth example of the shape of the external electrode in the moisture-sensitive sensor in accordance with aspects of the present disclosure.

FIG. 39 is a view showing a first example of the shape of the external electrode in the moisture-sensitive sensor according to an aspect of the disclosure. FIG. 40 is a view showing a second example of the shape of the external electrode in the moisture-sensitive sensor according to an aspect of the disclosure. FIG. 41 is a view showing a third example of the shape of the external electrode in the moisture-sensitive sensor according to an aspect of the disclosure. FIG. 42 is a view showing a fourth example of the shape of the external electrode in the moisture-sensitive sensor according to an aspect of the disclosure.

As the shape of the external electrode, it is possible to adopt a single-sided flat plate shape as shown in FIG. 39, a double-sided flat plate shape as shown in FIG. 40, a single-sided comb shape as shown in FIG. 41, a double-sided comb shape as shown in FIG. 42, or some other shape.

Figure 43:
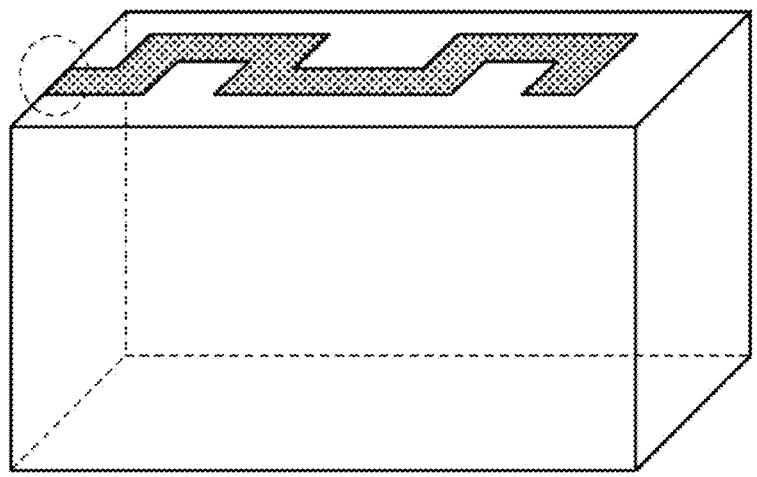
FIG. 43 is a view showing a fifth example of the shape of the external electrode in the moisture-sensitive sensor in accordance with aspects of the present disclosure.
Figure 44:
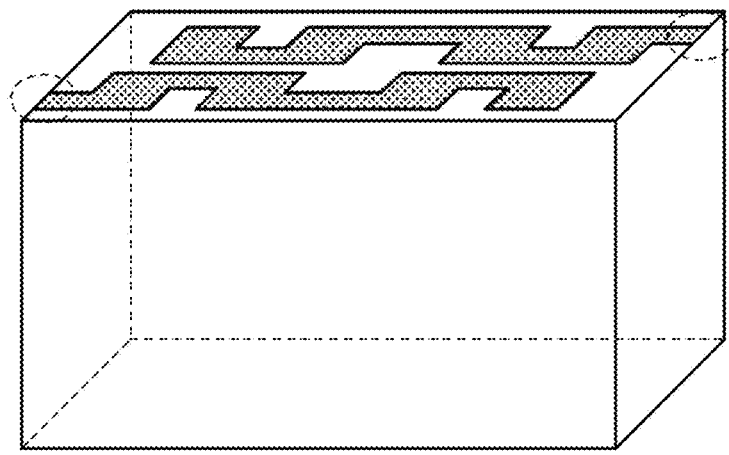
FIG. 44 is a view showing a sixth example of the shape of the external electrode in the moisture-sensitive sensor in accordance with aspects of the present disclosure.
Figure 45:
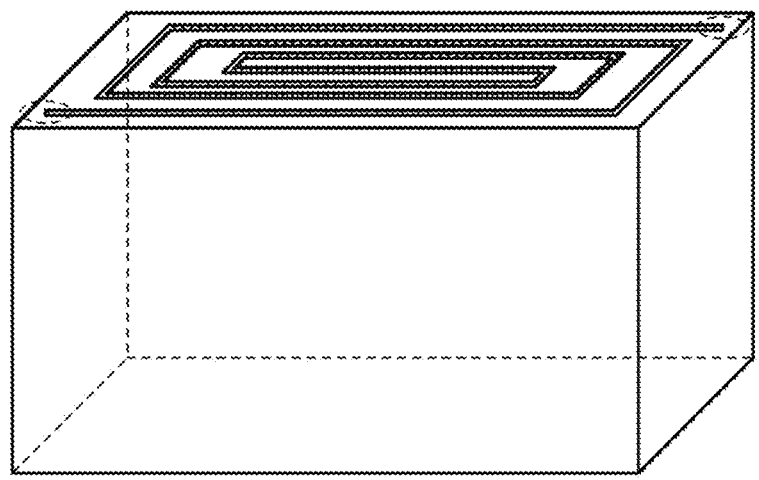
FIG. 45 is a view showing a seventh example of the shape of the external electrode in the moisture-sensitive sensor in accordance with aspects of the present disclosure.

FIG. 43 is a view showing a fifth example of the shape of the external electrode in the moisture-sensitive sensor according to an aspect of the disclosure. FIG. 44 is a diagram showing a sixth example of the shape of the external electrode in the moisture-sensitive sensor according to an aspect of the disclosure. FIG. 45 is a diagram showing a seventh example of the shape of the external electrode in the moisture-sensitive sensor according to an aspect of the disclosure.

As the shape of the external electrode, it is possible to adopt the single-sided meandering shape shown in FIG. 43, a double-sided meandering shape shown in FIG. 44, a single-sided coil shape shown in FIG. 45, or some other shape.

When the external electrodes in FIGS. 39 to 45 are combined with, for example, the moisture-sensitive sensor in FIG. 1, a first electrode E1 further includes an external electrode unit. The external electrode unit has a main surface (lower surface) covered with a moisture-sensitive member 2 and a main surface (upper surface) not covered with the moisture-sensitive member. As the material of the external electrode, a material generally used as an electrode material is usable and, for example, a metal such as Ag, Cu, Pt, Pd, Ni, or Al, or an oxide conductor such as indium tin oxide (ITO) or $LaNiO_3$ may be used.

In the humidity sensor described above, by forming the external electrode into a shape such as the flat plate shape, the comb shape, or the meandering shape, the capacitance of the humidity sensor material between the external electrode and the internal electrode may be detected, thereby increasing the capacitance of may be the entire element.

Further, when the external electrode is formed into the coil shape, it may be possible to increase not only the capacitance of the entire element but also the inductance.

When the humidity is measured using the LC resonance circuit, the LC resonance frequency may be lowered by increasing the inductance and capacitance. Hence a microcomputer with a low clock frequency may also be used, so that the degree of freedom of the microcomputer increases, and the microcomputer may be made less susceptible to a characteristic change due to disturbance such as a parasitic capacitance or a parasitic inductance.

Figure 46:
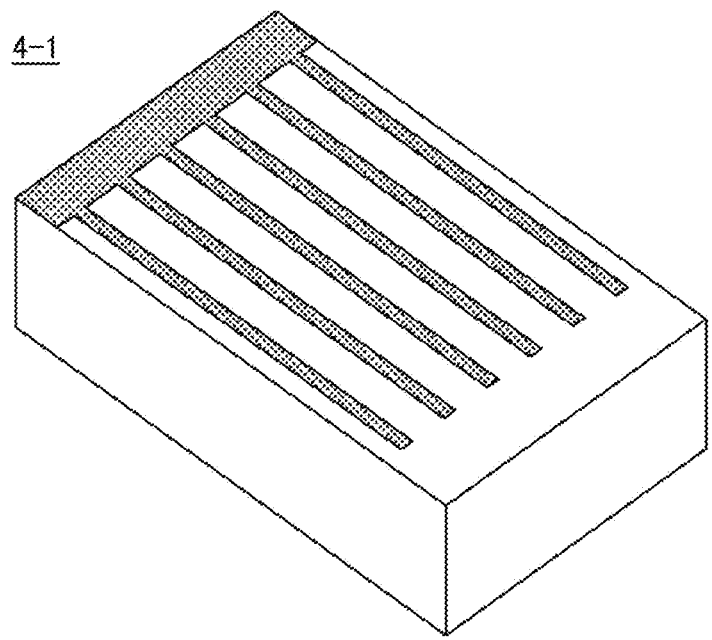
FIG. 46 is a view showing a first specific example of the upper electrode.
Figure 47:
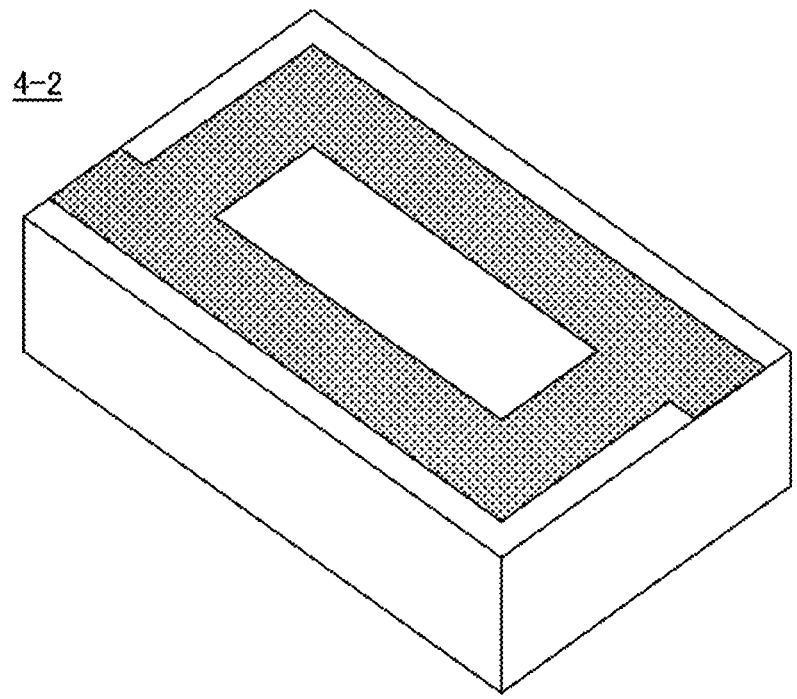
FIG. 47 is a view showing a second specific example of the upper electrode.

A specific example of the change in capacitance will be described. FIG. 46 is a view showing a first specific example of the upper electrode. FIG. 47 is a view showing a second specific example of the upper electrode.

As a first example, a sensor element (4-1), in which a comb-shaped upper electrode as shown in FIG. 46 is formed on one side of the sensor element (1-3), was examined.

As a second example, a sensor element (4-2), in which a single coil-shaped upper electrode as shown in FIG. 47 is formed on one side of the sensor element (2-3), was examined.

FIG. 48 is a diagram showing the results of examination of the sensor elements (4-1), (4-2). The capacitance of the sensor element (4-1) with the external electrode was 107.512 pF. This value is approximately 3.08% larger than a capacitance of 104.301 pF of a sensor element having no external electrode (corresponding to the sensor element (1-3) shown in FIG. 19).

The resonance frequency of the sensor element (4-2) having the external electrode was 0.692 GHz. This value is approximately 4.81% lower than a resonance frequency of 0.727 GHz of a sensor element having no external electrode (corresponding to the sensor element (2-3) shown in the FIG. 33).

It is seen that when the external electrode is provided as described above, the capacitance may be increased, and the resonance frequency may be lowered, as compared to when only the internal electrode is provided. However, these effects may be only auxiliary effects, and most of the characteristics are derived from the internal electrode. Hence the effect of the external electrode in the present disclosure is different from that of the external electrode in the conventional structure. That is, when only the external electrode is used as in the conventional structure, dew condensation and corrosive gas directly affect the characteristics of the humidity sensor. In contrast, in the cases of the sensor elements (4-1), (4-2) according to an aspect of the disclosure, the influences of dew condensation and corrosive gas on the characteristics of the humidity sensor may be significantly reduced by the presence of the internal electrode.

For setting the characteristic (capacitance or resonance frequency) to a desired value when only the external electrode is used, it may be necessary to shorten the distance between the electrodes or to increase the density of the electrode on the humidity sensor material. On the other hand, since the external electrode in the present disclosure is merely an auxiliary electrode, even when the characteristic of the sensor element is set to the desired value, the distance between the electrodes of the external electrode may be made long, and the density of the electrode on the humidity sensor material may be made low. Hence the external electrode does not greatly inhibit the sucking of water molecules to the humidity sensor material.

Another aspect of the disclosure illustrates an element in which the humidity sensor and the temperature sensor described above are integrated.

FIG. 49 is a view showing a configuration of a first example of terminal placement in a sensor element according to an aspect of the disclosure. A sensor element 30 shown in FIG. 49 is formed by integrating a humidity sensor unit 31 and a temperature sensor unit 36. The humidity sensor unit 31 has a terminal 32 and a terminal 33 on both side-surfaces, respectively. The temperature sensor unit 36 has a terminal 37 and a terminal 38 on both side-surfaces, respectively. Such a composite sensor includes a temperature-sensitive member integrated with the moisture-sensitive member. The temperature-sensitive member is formed of a temperature sensor material having resistivity changing in accordance with a change in temperature.

FIG. 50 is a view showing a configuration of a second example of the terminal placement in the sensor element according to an aspect of the disclosure. The sensor element 40 shown in FIG. 50 is formed by integrating the sensor unit 41 and the sensor unit 46. The sensor unit 41 is one of a humidity sensor unit or a temperature sensor unit, and the sensor unit 46 is the other of the humidity sensor unit or the temperature sensor unit. The sensor unit 41 has a terminal 42 and a terminal 43 on both side-surfaces, respectively. The sensor unit 46 has a terminal 47 and a terminal 48 on the upper surface.

In FIGS. 49 and 50, the humidity sensor unit may be any of the humidity sensors described in the aspects above. The temperature sensor unit integrated with the humidity sensor unit may be a generally known temperature sensor such as a negative temperature coefficient (NTC) thermistor, a temperature measuring resistor (Pt, PtCo, Ni, Cu, etc.), a thermocouple, a pyroelectric temperature sensor, or a semiconductor temperature sensor (diode, transistor, integrated circuit (IC), etc.). The integrated sensor element is provided with four terminals in total, two terminals for humidity measurement and two terminals for temperature measurement.

As shown in FIG. 49 or FIG. 50, by integrating the humidity sensor unit and the temperature sensor unit into the sensor element, the temperature and humidity may be measured with a single element, and the circuit may be reduced in size as compared to when the humidity sensor unit and the temperature sensor unit are used separately.

Further, the integration reduces the difference in humidity and temperature that the humidity sensor and the temperature sensor sense, so that the temperature of the humidity sensor and the humidity of the temperature sensor may be corrected more accurately than when the humidity sensor and the temperature sensor are used separately.

Figure 51:
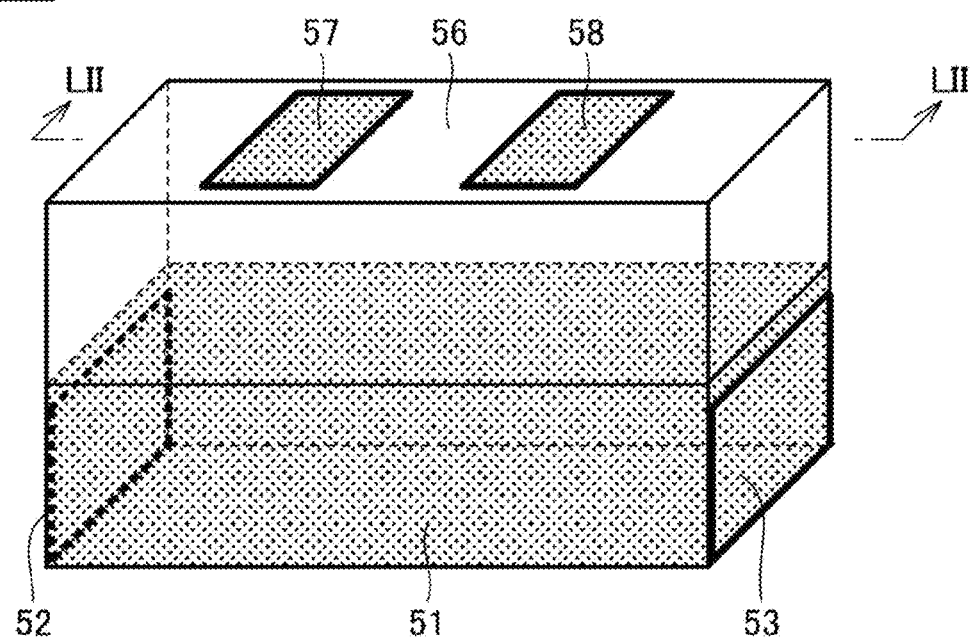
FIG. 51 is a view showing a first specific example of a sensor element formed by integrating a humidity sensor and a temperature sensor.
Figure 52:
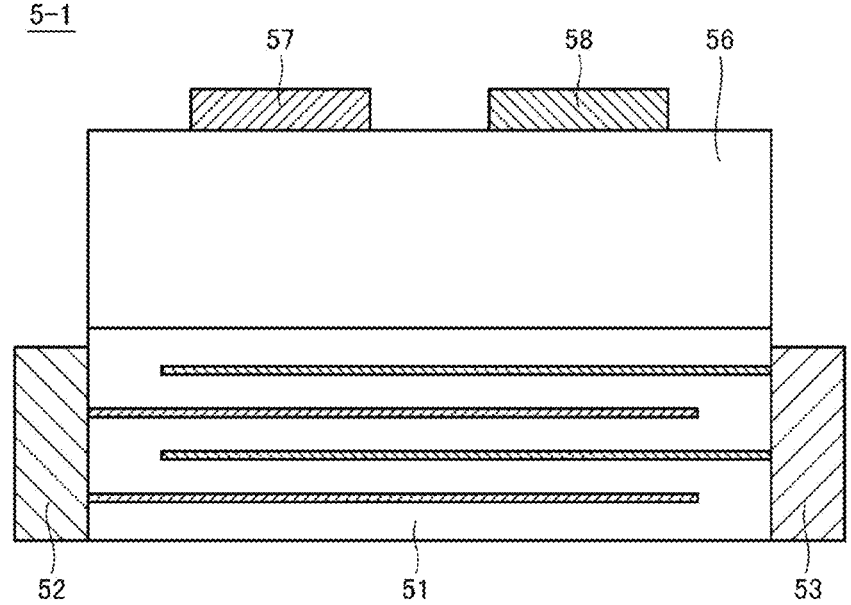
FIG. 52 is a sectional view taken along line LII-LII of the sensor element shown in FIG. 51.

Two more specific examples of the integration will be described below. FIG. 51 is a view showing a first specific example of the sensor element formed by integrating the humidity sensor and the temperature sensor. FIG. 52 is a sectional view taken along line LII-LII of the sensor element shown in FIG. 51.

A sensor element (5-1) includes a humidity sensor unit 51 and a temperature sensor unit 56. The humidity sensor unit 51 may be prepared by the same method as that described above.

The temperature sensor unit 56 is formed during the preparation process of the humidity sensor unit 51. A polyimide precursor sheet is formed in the same manner as in the method described above, and a thick film of $NiMn_2O_4$ having a thickness of 3 μm, patterned by using a metal mask, is formed on a sheet which will be the top in lamination by an aerosol deposition method (AD method) at room temperature. This thick film is an NTC thermistor to be the temperature sensor unit. NiCr/monel/Ag electrodes are formed by sputtering as NTC thermistor electrodes 57, 58. In this manner, a sheet for the temperature sensor is prepared.

The sheet for the temperature sensor and a sheet for the humidity sensor separately prepared are laminated, pressure-bonded, and then cut into a target size, which is fired in an air atmosphere at 350° C. for one hour. Thus, the sensor element (5-1) shown in FIGS. 51 and 52 may be prepared. In the sensor element (5-1), terminals 57, 58 for the temperature sensor are formed on the upper surface, and terminals 52, 53 for the moisture-sensitive sensor are formed on the end surfaces.

Figure 53:
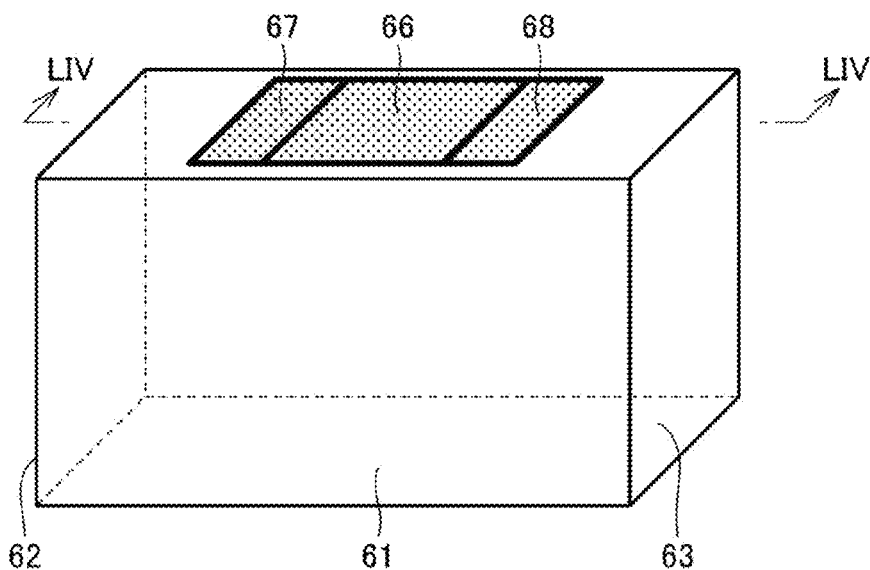
FIG. 53 is a second specific example of the sensor element formed by integrating the humidity sensor and the temperature sensor.
Figure 54:
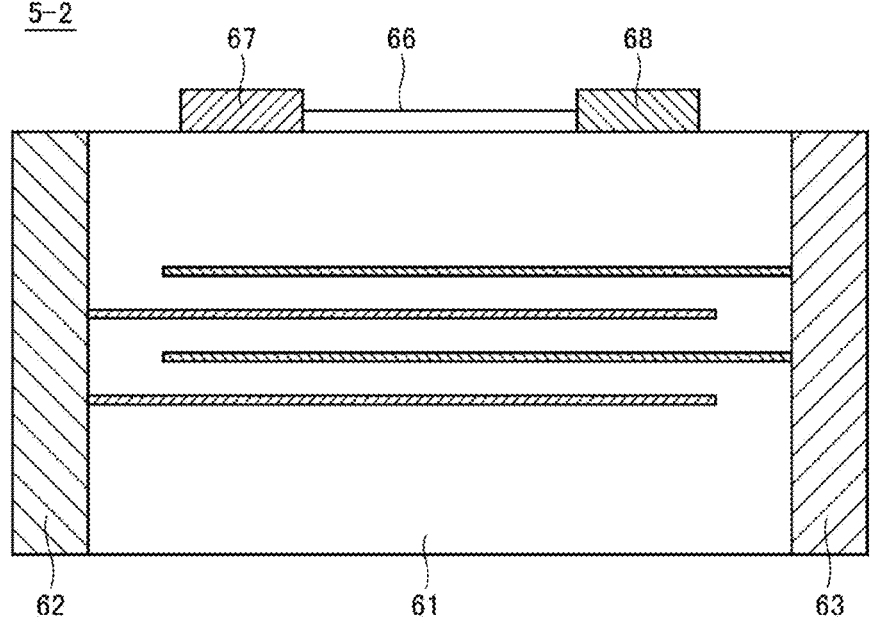
FIG. 54 is a sectional view taken along line LIV-LIV of the sensor element shown in FIG. 53.

The NTC thermistor as thus prepared has a B constant of 3450 K at 25° C./50° C. and a resistivity ρ of 2.6 kΩ cm at 25° C. Note that an NTC thermistor with any composition may be formed by using a raw material most suitable for the raw material at the time of preparing the NTC thermistor. Although $NiMn_2O_4$ has been described above as an example, the NTC thermistor according to an aspect of the disclosure is not limited to $NiMn_2O_4$ but may be any one so long as being used as an NTC thermistor in general. Further, the method of forming a thick film of the NTC thermistor is not limited to the AD method. The thick film may be formed by a general thin film/thick film forming method, such as a sputtering method or a chemical vapor deposition (CVD) method, so long as the film is formed at a glass transition temperature (about 450° C.) or lower of polyimide, Note that the temperature sensor unit integrated with the humidity sensor unit may be one except for the NTC thermistor or may be one using a change in electric resistance of Pt. FIG. 53 is a second specific example of the sensor element formed by integrating the humidity sensor and the temperature sensor. FIG. 54 is a sectional view taken along line LIV-LIV of the sensor element shown in FIG. 53. In the sensor element (5-2), terminals 67, 68 for the temperature sensor are formed on the upper surface, and terminals 62, 63 for the moisture-sensitive sensor are formed on the end surfaces.

The sensor element (5-2) includes a humidity sensor unit 61 and a temperature sensor unit 66. The humidity sensor unit 61 may be prepared by the same method as that described above.

The temperature sensor unit 66 may be prepared during the preparation process of the humidity sensor unit 61. A polyimide precursor sheet is formed in the same manner as in the method described above, and a Pt paste is printed on a sheet, which will be the top in lamination, to pattern the temperature sensor. In this manner, a sheet for the temperature sensor is prepared.

The sheet for the temperature sensor and a sheet for the humidity sensor separately prepared are laminated, pressure-bonded, and then cut into a target size, which is fired in an air atmosphere at 350° C. for one hour. Thus, the sensor elements (5-2) shown in FIGS. 53 and 54 may be prepared.

The Pt temperature sensor has a temperature coefficient of 3800 ppm/K from 25° C. to 85° C., and a characteristic equivalent to that of a general Pt temperature sensor is obtained. Note that the Pt temperature sensor may be formed by a general thin film/thick film forming method such as a vapor deposition method or a sputtering method. According to an aspect of the disclosure, the temperature sensor material used for the structure shown in FIG. 52 has been the NTC thermistor, and the temperature sensor material used for the structure shown in FIG. 54 has been Pt. However, the Pt temperature sensor may be used for the structure shown in FIG. 52, and the NTC thermistor may be used for the structure shown in FIG. 54.

According to an aspect of the disclosure, by making the GNDs of the temperature sensor unit and the humidity sensor unit common, the number of terminals of the integrated temperature sensor/humidity sensor is reduced to three in total.

By reducing the number of terminals in this manner, when the element size is the same, the space between the terminals for connecting the terminals to the substrate or the like may be increased as compared to when there are four terminals, thereby facilitating the design of the substrate on which the sensor element is mounted.

Figure 55:
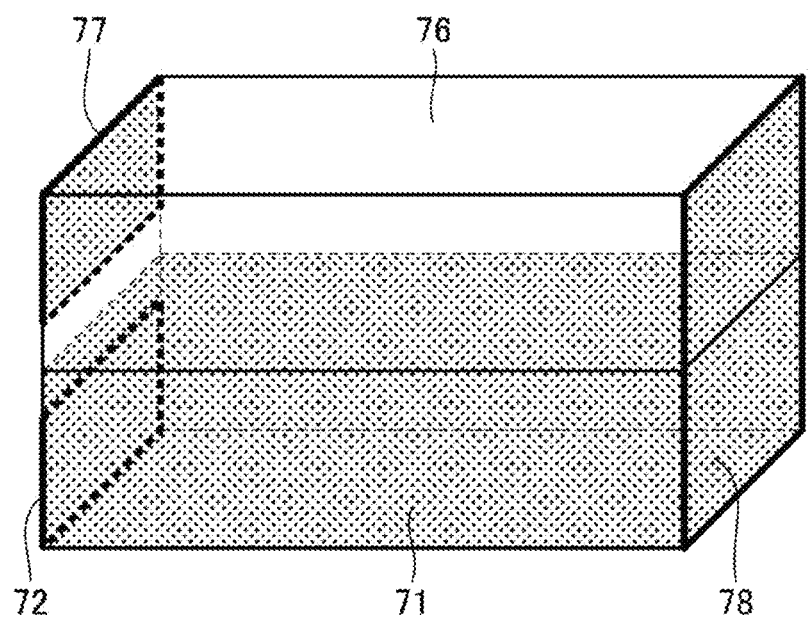
FIG. 55 is a view showing a configuration of a first example of terminal placement in a sensor element in accordance with aspects of the present disclosure.

FIG. 55 is a view showing a configuration of a first example of the terminal placement in the sensor element according to an aspect of the disclosure. A sensor element 70 shown in FIG. 55 is formed by integrating a humidity sensor unit 71 and a temperature sensor unit 76. The humidity sensor unit 71 has a terminal 72 and a terminal 78 on both side-surfaces, respectively. The temperature sensor unit 76 has a terminal 77 and the terminal 78 on both side-surfaces, respectively. The terminal 78 becomes a common GND terminal for the temperature sensor unit and the humidity sensor unit.

Figure 56:
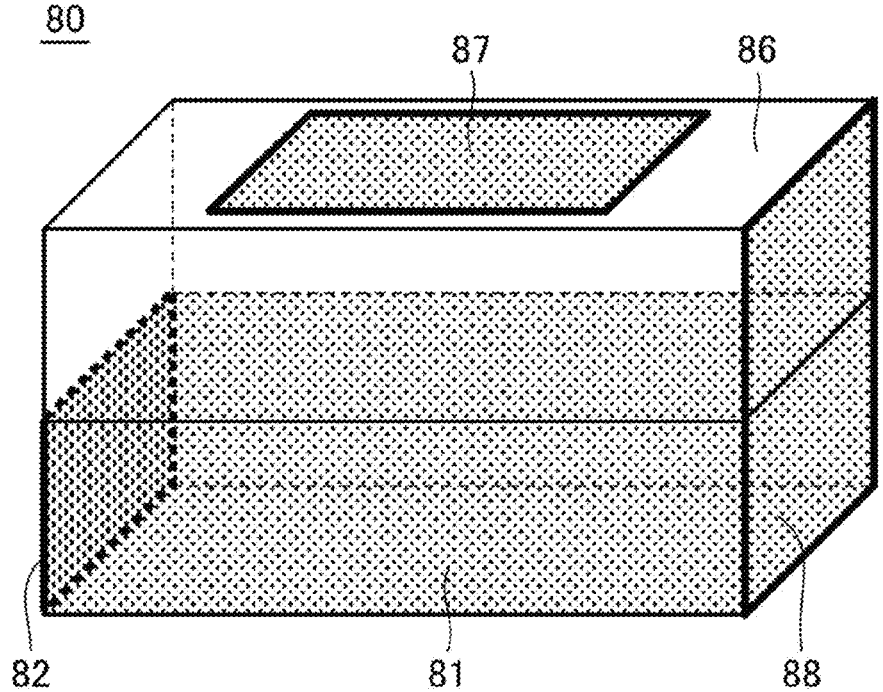
FIG. 56 is a view showing a configuration of a second example of the terminal placement in the sensor element in accordance with aspects of the present disclosure.

FIG. 56 is a view showing a configuration of a second example of the terminal placement in the sensor element according to an aspect of the disclosure. A sensor element 80 shown in FIG. 56 is formed by integrating a sensor unit 81 and a sensor unit 86. The sensor unit 81 is one of a humidity sensor unit or a temperature sensor unit, and the sensor unit 86 is the other of the humidity sensor unit or the temperature sensor unit. The sensor unit 81 has a terminal 82 and a terminal 88 on both side-surfaces, respectively. The sensor unit 86 has a terminal 87 on the upper surface and shares the terminal 88 on the side-surface with the sensor unit 81. The terminal 88 becomes a common GND terminal for the temperature sensor unit and the humidity sensor unit.

In FIGS. 55 and 56, the humidity sensor unit may be any of the humidity sensors described above.

Figure 57:
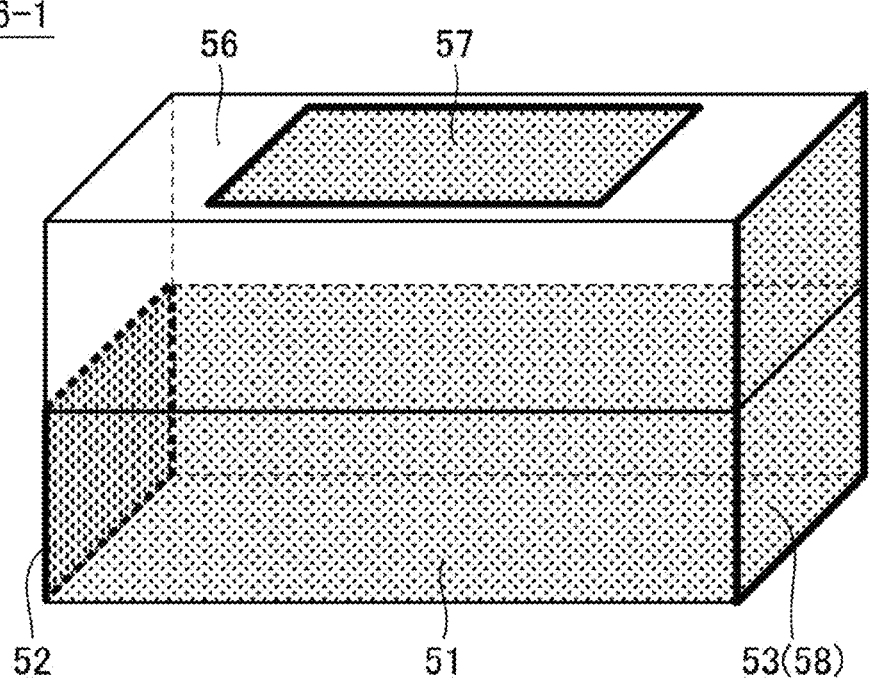
FIG. 57 is a view showing a first example in which a ground (GND) terminal is shared between a temperature sensor unit and a humidity sensor unit.
Figure 58:
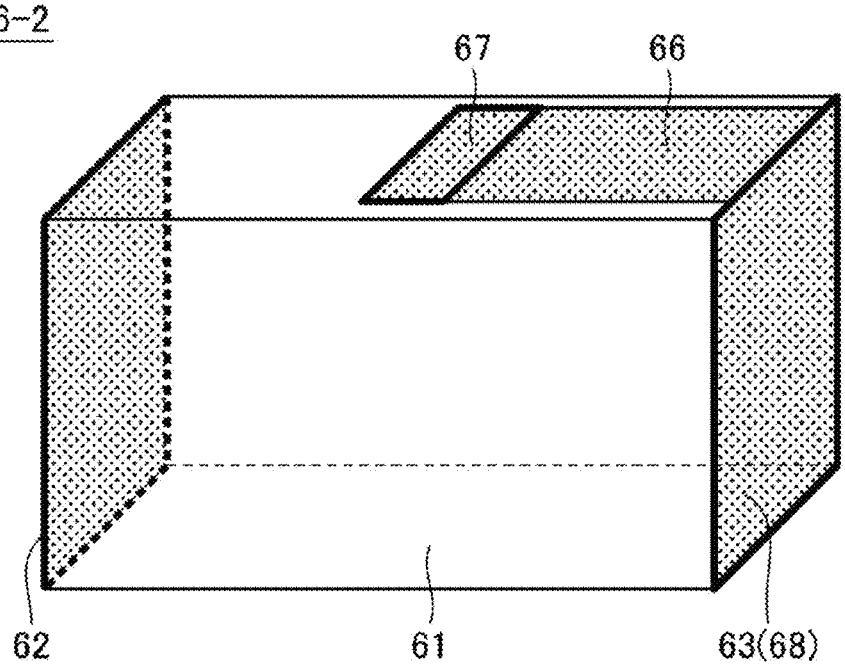
FIG. 58 is a view showing a second example in which the GND terminal is shared between the temperature sensor unit and the humidity sensor unit.

The performance of the temperature sensor unit was calculated in two cases. FIG. 57 is a view showing a first example in which the GND terminal is shared between the temperature sensor unit and the humidity sensor unit. FIG. 58 is a view showing a second example in which the GND terminal is shared between the temperature sensor unit and the humidity sensor unit.

Sensor elements, which are formed by changing the patterns of the temperature sensor units of the sensor elements (5-1), (5-2) illustrated according to an aspect of the disclosure in such a manner as respectively shown in FIGS. 57 and 58 and by integrating the GNDs of the temperature sensor units 56, 66 and the GND of the humidity sensor, are taken as a sensor element (6-1) and a sensor element (6-2). The preparation of the sensor element (6-1) and the sensor element (6-2) is the same as that of the sensor element (5-1) and the sensor element (5-2) to the middle, but at the time of forming extended electrodes for the humidity sensor units 51, 61, the humidity sensor units 51, 61 and the electrodes of the temperature sensor units 56, 66 are connected at one side portion (GND side) to form common electrodes 53 (58), 63(68). The extended electrode is formed using Ag paste and heated at 100° C. after printing. The temperature sensor unit prepared by this method exhibits characteristics equivalent to those of the sensor elements (5-1), (5-2) having a four-terminal structure.

According to an aspect of the disclosure, a composite material of a humidity sensor material and a material having relative permittivity higher than that of the humidity sensor material is used. A moisture-sensitive member used in accordance to an aspect of the disclosure is formed of a composite material that includes a first material (polyimide, etc.) having capacitance changing in accordance with a change in humidity, and a second material which is a dielectric substance having a dielectric constant different from that of the first material. Examples of the second material include ceramic dielectric materials, such as $BaTiO_3$, $Pb(Zr,Ti)O_3$, $(K,Na)NbO_3$, and $CaCu_3T_{14}O_{12}$, which have a dielectric constant higher than that of the first material. The mixed state of the composite material may be a uniform mixture of the humidity sensor material and the dielectric material, a non-uniform mixture, or a localized mixture.

The use of the composite material may increase the capacitance of the humidity sensor. Examination was performed on how the capacitance changes in the case of using the composite material. FIG. 59 is a diagram showing a comparison in capacitance change between a sensor using polyimide and a sensor using a composite material of a first example. FIG. 60 is a diagram showing a comparison in capacitance change between a sensor using polyimide and a sensor using a composite material of a second example.

A description will be given of a method of preparing a composite material using polyimide as a humidity sensor material and a material with high relative permittivity as $BaTiO_3$ which is a ferroelectric material. Polyimide varnish is used as a polyimide raw material, and polyimide varnish and powder of $BaTiO_3$ are mixed such that the volume ratio of polyimide to $BaTiO_3$ is 1:1. The mixture is used as a raw material for preparing a composite sheet, and sheet formation, electrode printing, lamination, pressure bonding, and firing are performed in the same manner and under the same conditions as described above. Thus, a humidity sensor using the composite material of polyimide and $BaTiO_3$ may be prepared. When sensor elements having structures, formed by preparing the same structures as those of the humidity sensor elements (1-1), (1-2), (1-3) illustrated according to an aspect of the disclosure using the polyimide/$BaTiO_3$ composite sheet, are taken as sensor elements (7-1), (7-2), (7-3), the capacitances of the sensor elements are 6.683 pF, 13.763 pF, and 1.215 nF, as shown in FIG. 59, which are approximately 8.6 to 11.6 times larger than when only polyimide is used.

Similarly, it is also possible to prepare a humidity sensor element using a composite material in which polyimide and $CaCu_3T_{14}O_{12}$, which is not a ferroelectric substance but has a dielectric constant higher than that of polyimide, are mixed so as to have a volume ratio of 5:1 Sensor elements when the composite material is used for the same structures as those of the sensor elements (1-1), (1-2), (1-3) are taken as a sensor element (7-4), a sensor element (7-5), and a sensor element (7-6), respectively. According to computer simulation, as shown in FIG. 60, the capacitances are 31.414 pF, 66.033 pF, and 5.902 nF, which are approximately 40.5 to 56.6 times larger than when only polyimide is used.

According to an aspect of the disclosure, a description will be given of an example where a composite material of a humidity sensor material and a material having relative magnetic permeability higher than that of the humidity sensor material is used. A moisture-sensitive member used according to an aspect of the disclosure is formed of a composite material including a first material (polyimide, etc.) having capacitance changing in accordance with a change in humidity, and a second material which is a magnetic substance. Examples of the second material include various ferrites (spinel ferrite, hexagonal ferrite, garnet ferrite, etc.), various ceramic magnetic materials (iron oxide, etc.), permalloy, various stainless steels, and various metal magnetic materials (FePt, PtCo, FeCo, Ni, Fe, etc.). The mixed state of the composite material may be a uniform mixture of the humidity sensor material and the magnetic material, a non-uniform mixture, or a localized mixture.

According to an aspect of the disclosure, the material having high relative magnetic permeability is used, so that the inductance of the humidity sensor may be increased. In addition, an effect, such as elimination of the need for an external inductor at the time of constituting the LC oscillation circuit, may be expected.

Examination was performed on how the resonance frequency changes when the composite material of the humidity sensor material and the material having relative magnetic permeability higher than that of the humidity sensor material is used. FIG. 61 is a diagram showing a comparison in resonance frequency change between a sensor using polyimide and a sensor using a composite material of a third example.

A description will be given of a method of preparing a composite material using polyimide as the humidity sensor material and a ferrite material having relative magnetic permeability μr of 1300 as the material having high relative magnetic permeability μr. The polyimide varnish and the powder of the ferrite material are mixed such that the volume ratio of the polyimide to ferrite material is 1:1. The mixture is used as a raw material for preparing a composite sheet, and sheet formation, electrode printing, lamination, pressure bonding, and firing are performed in the same manner and under the same conditions as described above. Thus, a humidity sensor using a composite material of polyimide and the ferrite material may be prepared. When sensor elements having structures, formed by preparing the same structures as those of the sensor elements (2-1), (2-2), (2-3) illustrated according to an aspect of the disclosure using the polyimide/ferrite material composite sheet, are taken as sensor elements (8-1), (8-2), (8-3), respectively, the resonance frequencies of those sensor elements also decrease by about 49% to 95% to 4.102 GHz, 0.656 GHz, and 0.039 GHz, respectively, as shown in FIG. 61.

According to an aspect of the disclosure, a sensor element obtained by a combination of a composite material of the humidity sensor material, the dielectric material, and the magnetic material and the composite material of the humidity sensor material and the dielectric material, and the composite material of the humidity sensor material and the magnetic material. A moisture-sensitive member used in accordance to an aspect of the disclosure is formed of a composite material including a first material (polyimide, etc.) having capacitance changing in accordance with a change in humidity, a second material which is a dielectric substance, and a third material which is a magnetic substance.

Thereby, both the capacitance and the inductance of the humidity sensor may be increased. In addition, the external inductor, which is used at the time of constituting the LC oscillation circuit, may become unnecessary.

Examination was performed on how the resonance frequency of the sensor element according to an aspect of the disclosure changes. FIG. 62 is a diagram showing a comparison in resonance frequency change between a sensor using polyimide and a sensor using a composite material of a fourth example.

As described above, a composite sheet may be prepared by mixing a humidity sensor material, a dielectric material having a dielectric constant higher than that of the humidity sensor material, and a magnetic material having a magnetic permeability higher than that of the humidity sensor material.

For example, a case will be described where polyimide varnish, $BaTiO_3$ powder, and ferrite material powder are mixed such that the volume ratio of polyimide, $BaTiO_3$, and the ferrite material (with relative magnetic permeability μr of 1300) is 2:1:1. When elements having structures, formed by preparing the same structures as those of the sensor elements (2-1), (2-2), (2-3) illustrated according to an aspect of the disclosure using the polyimide/$BaTiO_3$/ferrite material composite sheet in the same manner described above, are taken as sensor elements (9-1), (9-2), (9-3), respectively, the resonance frequencies of those sensor elements also decrease by about 69% to 96% to 2.531 GHz, 0.483 GHz, and 0.028 GHz, respectively, as shown in FIG. 62.

In a case where the sensor element is prepared using a composite material as described above, there is an advantage in that when the ratios of the dielectric and magnetic materials in the moisture-sensitive member of the humidity sensor are increased, the capacitance and the inductance increase. On the other hand, there is a disadvantage in that the sensitivity to a change in humidity deteriorates because these materials do not respond to the humidity.

Therefore, according to an aspect of the disclosure, in the case of using a composite material of the humidity sensor material and the dielectric substance or the magnetic substance, the proportion of the humidity sensor material is made higher in at least a part of the surface side of the humidity sensor element than in the inside of the element. A moisture-sensitive member used in accordance with an aspect of the disclosure includes a first portion and a second portion disposed closer to the main surface (outer surface) of the humidity sensor than the first portion and having a higher proportion of a first material (humidity sensor material such as polyimide) than the first portion. The distribution of the proportion of the humidity sensor material may be any distribution such as uniform, non-uniform, or localized distribution so long as the above requirements are satisfied.

Figure 63:
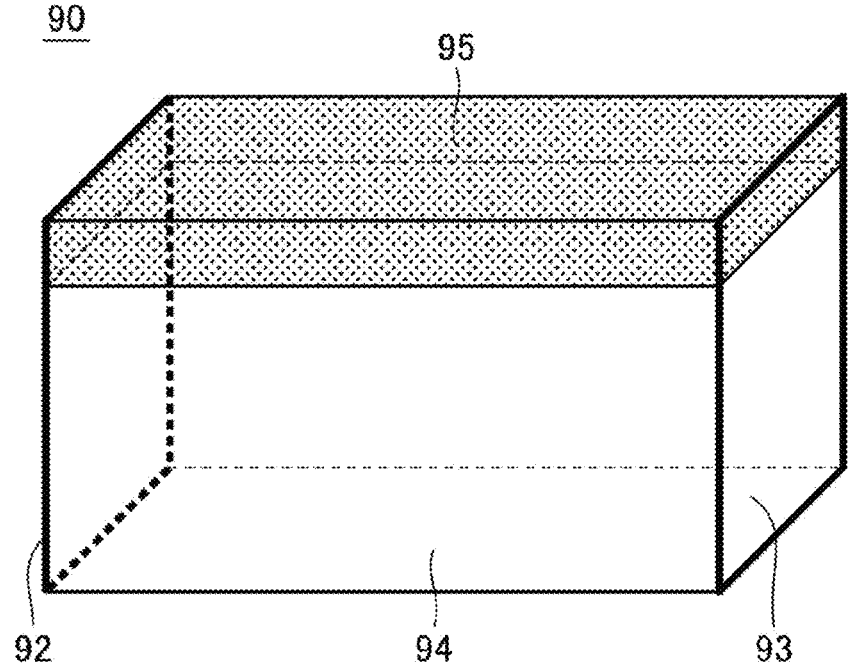
FIG. 63 is a view showing a first example of placement of a portion of the composite material having a high proportion of the humidity sensor material and a portion having a low proportion of the humidity sensor material.

FIG. 63 is a view showing a first example of placement of a portion of the composite material having a high proportion of the humidity sensor material and a portion having a low proportion of the humidity sensor material. A sensor element 90 shown in FIG. 63 has a terminal 92 and a terminal 93 on both side-surfaces, respectively. The moisture-sensitive member includes a portion 94 having a low proportion of the humidity sensor material and a portion 95 having a higher proportion of the humidity sensor material than the portion 94.

Figure 64:
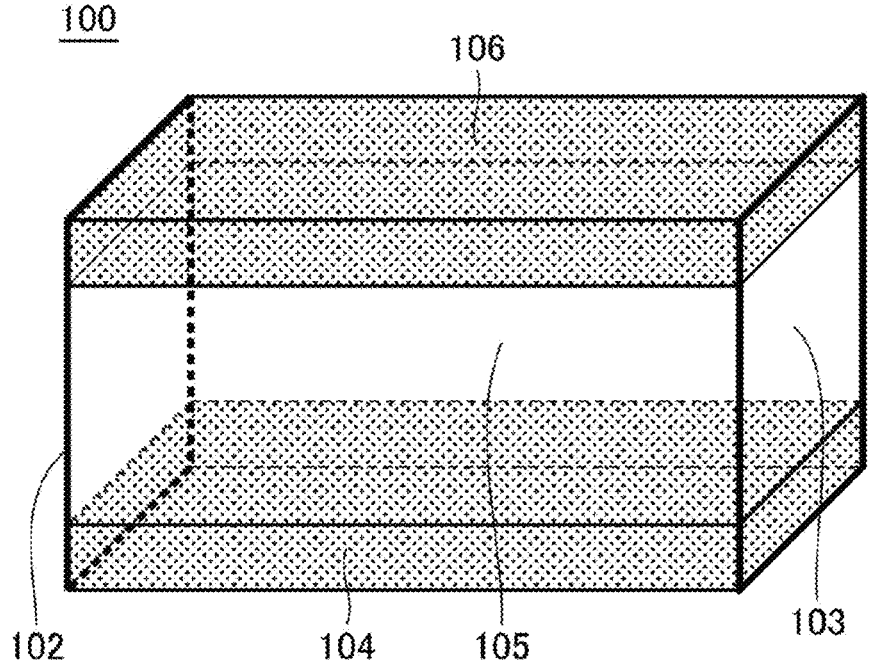
FIG. 64 is a view showing a second example of placement of the portion of the composite material having a high proportion of the humidity sensor material and the portion having a low proportion of the humidity sensor material.
Figure 65:
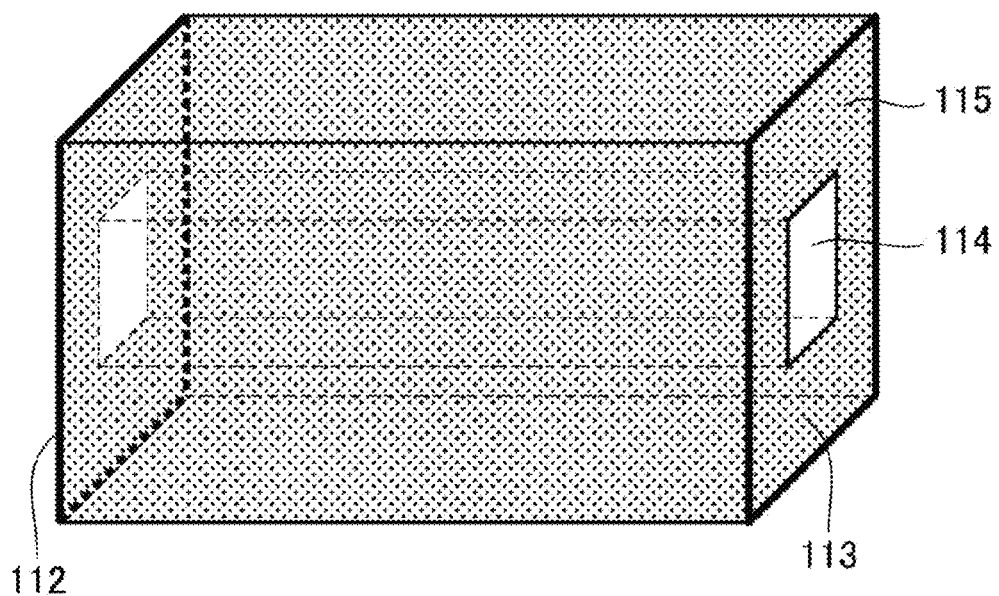
FIG. 65 is a view showing a third example of placement of the portion of the composite material having a high proportion of the humidity sensor material and the portion having a low proportion of the humidity sensor material.

FIG. 64 is a view showing a second example of placement of the portion of the composite material having a high proportion of the humidity sensor material and the portion having a low proportion of the humidity sensor material. The sensor element 100 shown in FIG. 64 has a terminal 102 and a terminal 103 on both side-surfaces, respectively. The moisture-sensitive member includes a portion 105 having a low proportion of the humidity sensor material and portions 104,106 having higher proportions of the humidity sensor material than the portion 105. FIG. 65 is a view showing a third example of placement of the portion of the composite material having a high proportion of the humidity sensor material and the portion having a low proportion of the humidity sensor material. The sensor element 110 shown in FIG. 65 has a terminal 112 and a terminal 113 on both side-surfaces, respectively. The moisture-sensitive member includes a portion 114 having a low proportion of the humidity sensor material and a portion 115 having a higher proportion of the humidity sensor material than the portion 114. The portion 115 is formed so as to surround the portion 114 from four sides.

Figure 66:
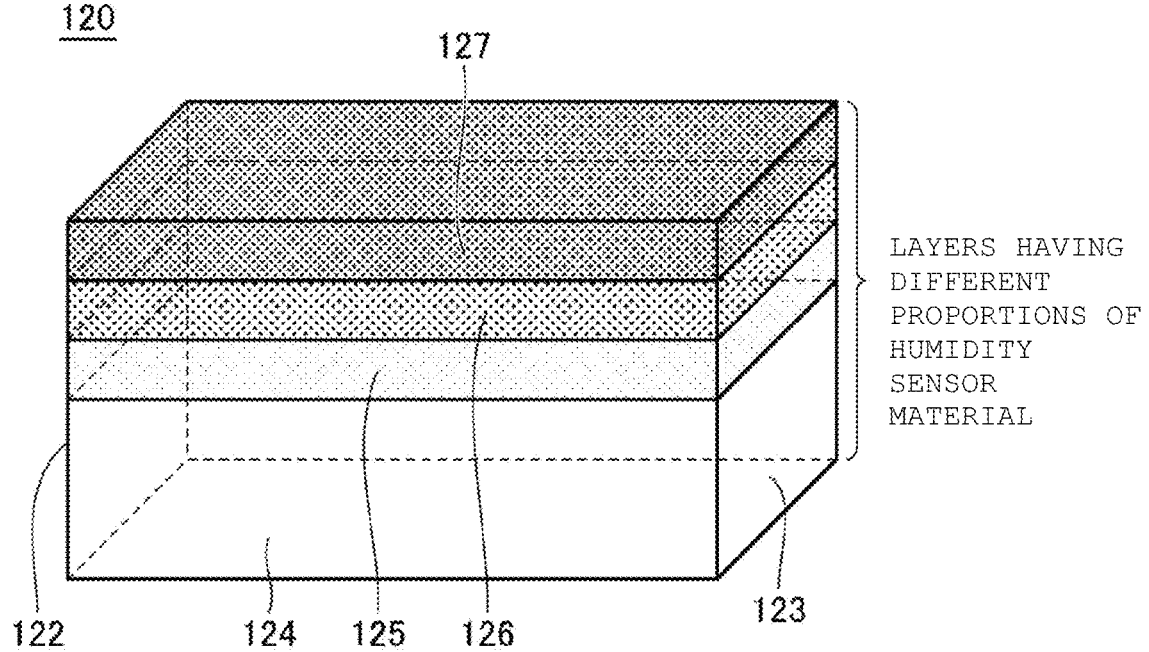
FIG. 66 is a view showing a fourth example of placement of the portion of the composite material having a high proportion of the humidity sensor material and the portion having a low proportion of the humidity sensor material.

FIG. 66 is a view showing a fourth example of placement of the portion of the composite material having a high proportion of the humidity sensor material and the portion having a low proportion of the humidity sensor material. A sensor element 120 shown in FIG. 66 has a terminal 122 and a terminal 123 on both side-surfaces, respectively. The moisture-sensitive member includes portions 124 to 127 having different proportions of the humidity sensor material. The portion 127 may have the highest proportion of the humidity sensor material among these.

As shown in FIGS. 63 to 66, when the proportion of the humidity sensor material in at least a part of the surface side of the humidity sensor element is made higher than that in the inside of the element, a change in capacitance due to the humidity of the humidity sensor element may be increased, thereby enabling highly sensitive measurement.

Preferably, by increasing the proportions of the dielectric substance and the magnetic substance in the center portion of the humidity sensor element and increasing the proportion of polyimide near the surface of the humidity sensor element, the sensitivity to humidity may be increased while the capacitance and inductance may be kept large.

Figure 67:
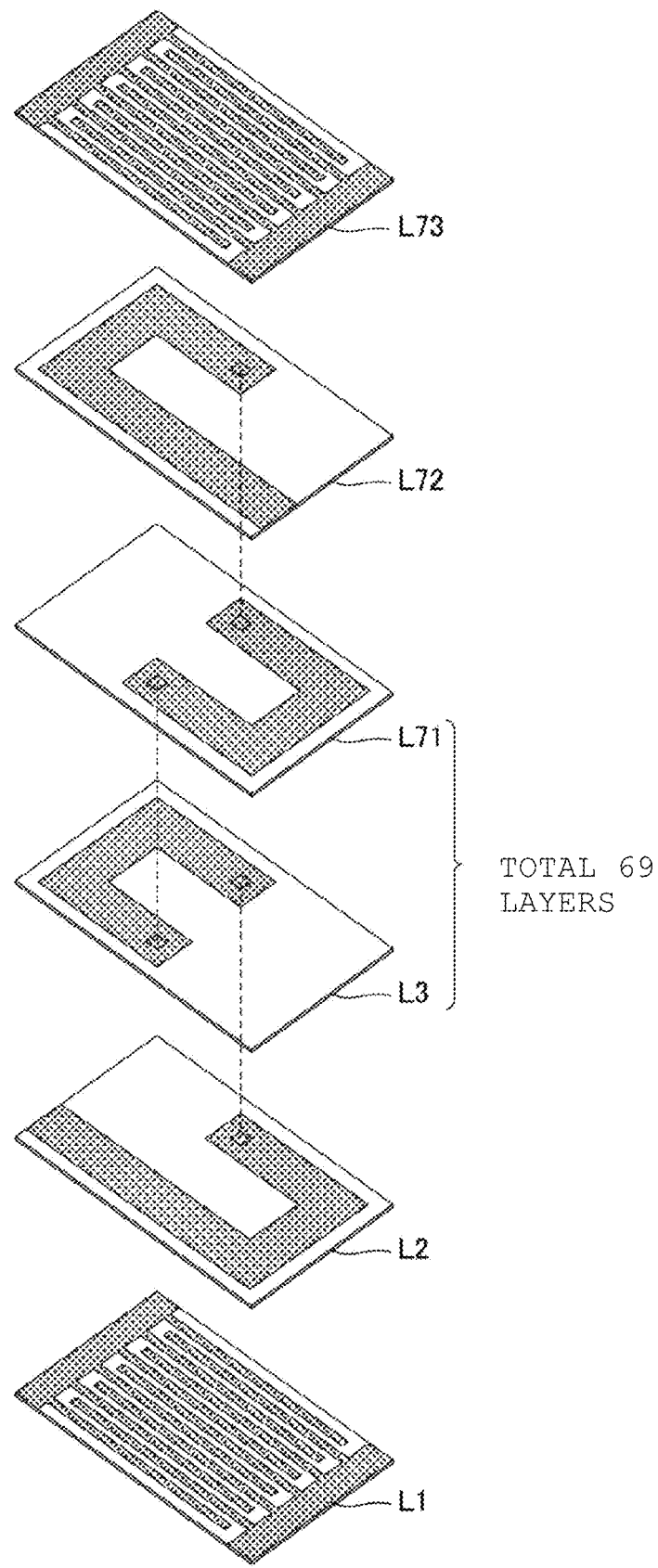
FIG. 67 is a view for explaining a specific example in which a density distribution of a material is provided.

FIG. 67 is a view for explaining a specific example in which a density distribution of a material is provided. A sensor element as follows is taken as a sensor element (10-1): in a structure where electrodes are laminated as shown in FIG. 67, of laminated sheets L1 to L73 in which 73 layers are laminated, two layers from the surface (the total of four layers L1, L2, L72, L73 in upper and lower portions) are 100% polyimide sheets, and 69 layers (L3 to L71) in the center are composite sheets. The mixture ratio of the composite sheet is a volume ratio of polyimide to the ferrite material (with relative magnetic permeability μr of 1300) of 1:1. In the sensor element (10-1), an electrode sandwiched between the polyimide sheets of the first layer (laminated sheet L1) and the seventy-third layer (laminated sheet L73) is made to be a comb electrode, which is the same as that of the sensor element (1-1). The sensor element (8-3) illustrated according to an aspect of the disclosure in which the laminated sheets L2 to L72 each have a similar structure and all the layers are composite sheets were selected as a comparison target and as compared to the sensor elements (10-1) described above.

FIG. 68 is a diagram showing the resonance frequencies and the rates of change in resonance frequency in the sensor elements having different density distributions of the humidity sensor material. As shown in FIG. 68, the resonance frequency of the sensor element (10-1) is 42.822 MHz, which is slightly higher than the resonance frequency of the sensor element (8-3) of 39.836 MHz. However, according to FIG. 68, the rate of change in resonance frequency due to the change in humidity from 10% RH to 90% RH of the sensor element (10-1) is 26.39%, which is higher than 23.19% of that of the sensor element (8-3). It may thus be seen that in the sensor element (10-1) according to an aspect of the disclosure, the sensitivity to humidity may be increased as compared to the sensor element (8-3) described above.

In the sensor element (10-1), the material composition in the center portion is the same for comparison with the sensor element (8-3), but the resonance frequency may be lowered by increasing the proportion of the ferrite material in the center portion. Further, by increasing the proportion and thickness of the polyimide on the surface, the sensitivity to humidity may be increased despite the increase in the resonance frequency of the sensor element.

A humidity sensor according to an aspect of the disclosure is formed by setting the proportion of the humidity sensor material on the element surface to 100% and setting the proportion of the humidity sensor material inside the element to 0% in the configuration of the humidity sensor according to an aspect of the disclosure. This proportion is the most suitable example in which the change in capacitance due to the change in humidity may be increased while the capacitance and inductance are increased.

In the humidity sensor according to an aspect of the disclosure, the capacitance and/or the inductance may be made the largest among the sensor elements in which the sheets having different proportions are laminated as illustrated according to an aspect of the disclosure, and hence the resonance frequency may be made the lowest.

By setting the proportion of the humidity sensor material of the surface sheet to 100%, a sufficiently large sensitivity is obtained due to the change in capacitance of the surface sheet.

A description will be given of a method of preparing a sensor element (11-1), as an example, in which in the electrode structure shown in FIG. 67, the 69 layers in the center part are each made of a sheet of a 100% ferrite material (with relative magnetic permeability μr of 1300), and two upper and lower layers of the surface layers are each made of the 100% polyimide sheet. In this case, the center part is the same as a general chip inductor structure, so that a general preparation process may be used as it is.

Ferrite material powder, a binder, and a plasticizer are dissolved in water, agitated, and defoamed to form slurry for sheet molding. A sheet is moved while the slurry is dried at a temperature of 60° C. by using a 100 μm doctor blade to prepare a ferrite sheet on a PET film. After Ag electrodes are printed on two of the sheets, 69 sheets are laminated between the two sheets and pressure-bonded at a pressure of 200 MPa. Thereafter, firing is performed at 900° C. for two hours to obtain laminated ferrite sheets L3 to L71.

The polyimide varnish was spin-coated on the laminated ferrite sheets L3 to L71 and then dried at 130° C. Thereafter, a comb electrode pattern of Ag is printed, and the polyimide varnish is further spin-coated on the upper portion of the pattern and dried at 130° C. The same process is performed for another surface of the laminated ferrite sheets. Thus, laminated sheets L1 to L73, having the structure of the polyimide precursor/Ag electrode/polyimide precursor/laminated ferrite sheets/polyimide precursor/Ag electrode/polyimide precursor, were produced. In this state, firing is performed at 350° C. for one hour in an air atmosphere and then cut into a target size, whereby the sensor element (11-1) may be prepared.

As shown in FIG. 68, it is seen that the resonance frequency of the sensor element (11-1) is 9.703 MHz, which is lower than the resonance frequency of the sensor element (10-1). The rate of change in the resonance frequency of the sensor element (11-1) due to the change in humidity from 10% RH to 90% RH was 12.70%. Although the rate of change is lower than that of the sensor element (10-1), this is a change in frequency of about 1.2 MHz, which may be very large and sufficiently high in sensitivity. Therefore, by adopting the structure of the sensor element (11-1), a sufficiently large change in frequency may be obtained while the resonance frequency is lowered significantly.

As described above, in the humidity sensor according to an aspect of the disclosure, with the electrodes being inside the humidity sensor material, even when water droplets adhere to the surface of the humidity sensor material caused by dew condensation, it is possible to eliminate an influence of a characteristic change due to a short circuit between the electrodes or an increase in electrode area.

Further, with the electrodes being inside the humidity sensor material, the corrosion of the electrodes by corrosive gas such as sulfur gas or nitrogen gas in the atmosphere may be prevented, so that the humidity may be measured without causing a deterioration in characteristics even in the presence of corrosive gas.

With the electrodes being inside the humidity sensor material, an area in which water molecules may be sucked to the humidity sensor material becomes wider, and the sensitivity may be increased.

In addition to the above, inductance and capacitance may be increased by forming the internal electrode into a coil shape or a laminated structure.

When a change in humidity is measured with the LC resonance circuit, the LC resonance frequency may be lowered by increasing the inductance or the capacitance, whereby the degree of freedom of a usable microcomputer increases, and the microcomputer may be made less susceptible to a characteristic change due to disturbance such as a parasitic capacitance or a parasitic inductance.

According to an aspect of the disclosure, a radio-frequency identification (RFID) humidity sensor in which a humidity sensor is mounted on an RFID tag will be described.

RFID is a technology that has attracted attention as a technology to replace bar codes, and by storing information in an IC embedded in an RFID tag and reading the information in a non-contact manner using an RFID reader, many pieces of information may be read simultaneously from a remote location. In view of these characteristics, RFID tags have recently been applied to environmental history management in distribution or product management, and an RFID humidity sensor for detecting humidity data has been developed as an example.

In such an RFID humidity sensor as well, the sensitivity of the sensor may be improved by applying a configuration similar to that described above.

Figure 69:
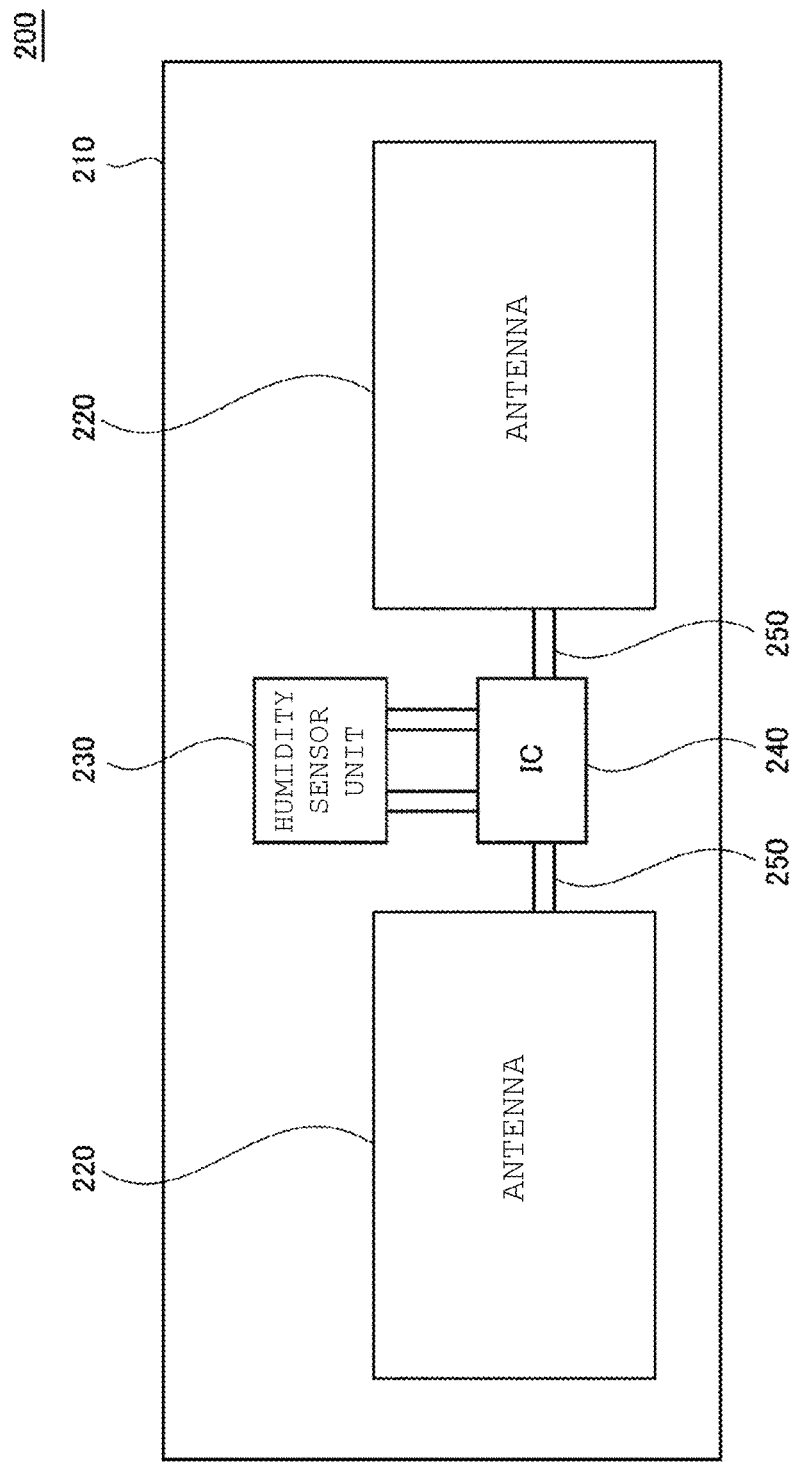
FIG. 69 is a block diagram of an RFID humidity sensor tag in accordance with aspects of the present disclosure.

FIG. 69 is a block diagram of an RFID humidity sensor tag (hereinafter also referred to simply as "RFID sensor") 200 of according to an aspect of the disclosure. Referring to FIG. 69, the RFID sensor 200 is provided with a substrate 210, an antenna 220 for communicating with an RFID reader (not shown), a humidity sensor unit 230, an integrated circuit (IC) 240, and a wiring pattern 250 for connecting these.

The substrate 210 is formed of a moisture-sensitive member having capacitance changing due to a change in humidity. As the moisture-sensitive member, for example, polyimide (PI), polyamide-imide (PAD, cellulose acetate butyrate (CAB), polymethyl methacrylate (PMMA), vinyl crotonate, polyethylene terephthalate, and mixtures thereof may be used.

A humidity sensor electrode included in the humidity sensor unit 230, the antenna 220, and the wiring pattern 250 are formed on the substrate 210. As the electrode, the antenna 220, and the wiring pattern 250, for example, metal materials such as Ag, Cu, Pt, Pd, Ni, and Al are used In the humidity sensor unit 230, as described later with reference to FIGS. 71(a)-(b) and the like, the humidity sensor electrodes are disposed to face each other, and all or a part of the humidity sensor electrodes are covered with a moisture-sensitive member.

The antenna 220 and the humidity sensor unit 230 are electrically connected by the wiring pattern 250. An inductance component and a capacitance component of the antenna 220 and the humidity sensor unit 230 form an LC resonance circuit.

The IC 240 is activated by power from the RFID reader received by the antenna 220 and measures the impedance of the LC resonance circuit formed by the antenna 220 and the humidity sensor unit 230. The IC 240 stores the relationship between the impedance and the humidity, obtained in advance by an experiment or the like, and calculates the humidity from the measured impedance. Further, the IC 240 transmits the calculated humidity data to the RFID reader through the antenna 220.

FIG. 70 is a diagram for schematically explaining a method of measuring humidity by using the RFID sensor 200. The antenna 220 and the humidity sensor unit 230 are designed such that the impedance is minimized with a reference humidity at a measurement frequency F0 (solid line LN10). When the capacitance of the moisture-sensitive member changes due to a change in humidity in the atmosphere, the resonance frequency of the LC resonance circuit formed by the antenna 220 and the humidity sensor unit 230 changes to F1 (dashed line LN11). Then, the impedance at the measurement frequency F0 increases. In the RFID, since power is supplied from the RFID reader through the antenna 220, a change in humidity from the reference humidity may be measured by measuring a decrease in the supplied power accompanying a change in impedance with the IC 240.

In the case of the RFID sensor, with the antenna 220 being electrically connected to the humidity sensor unit 230, the antenna 220 itself also functions as a part of the humidity sensor electrode. Therefore, the capacitance component in the LC resonance circuit may be increased as compared to when only the humidity sensor electrode is provided. In RFID, the frequency for communication is determined by the standard, and the resonance frequency f of the LC resonance circuit is determined by $f=1/(2\pi(LC))$, so that the influence of the humidity sensor unit 230 which contributes to the resonance frequency becomes large. In other words, in the RFID sensor, a change in resonance frequency (i.e., change in impedance) due to a change in humidity is increased by the antenna 220, and hence the detection sensitivity may be improved.

FIGS. 71(a)-(b) are views showing an example of the humidity sensor unit 230 in FIG. 69. FIG. 71(a) is a plan view of the humidity sensor unit 230, and FIG. 71(b) is a sectional view of the humidity sensor unit 230. Referring to FIGS. 71(a)-(b), the humidity sensor unit 230 includes a pair of humidity sensor electrodes 232 formed on the substrate 210. A comb electrode 233 is formed at the end of each humidity sensor electrode 232, and the portion of the comb electrode 233 is covered with a moisture-sensitive member 231. At least one of the humidity sensor electrodes 232 is connected to the antenna 220 through a wiring pattern 250. The humidity sensor electrode 232 is also connected to the IC 240, and the impedance of the LC resonance circuit formed by the antenna 220 and the humidity sensor unit 230 is measured with the IC 240.

As described above, the capacitances of the substrate 210 and the capacitance of the moisture-sensitive member 231 change due to a change in humidity in the atmosphere, and the capacitance (impedance) between the humidity sensor electrodes 232 changes. By measuring the change in capacitance between the electrodes, the change in humidity in the atmosphere may be measured.

Figures 72A, 72B, 73:
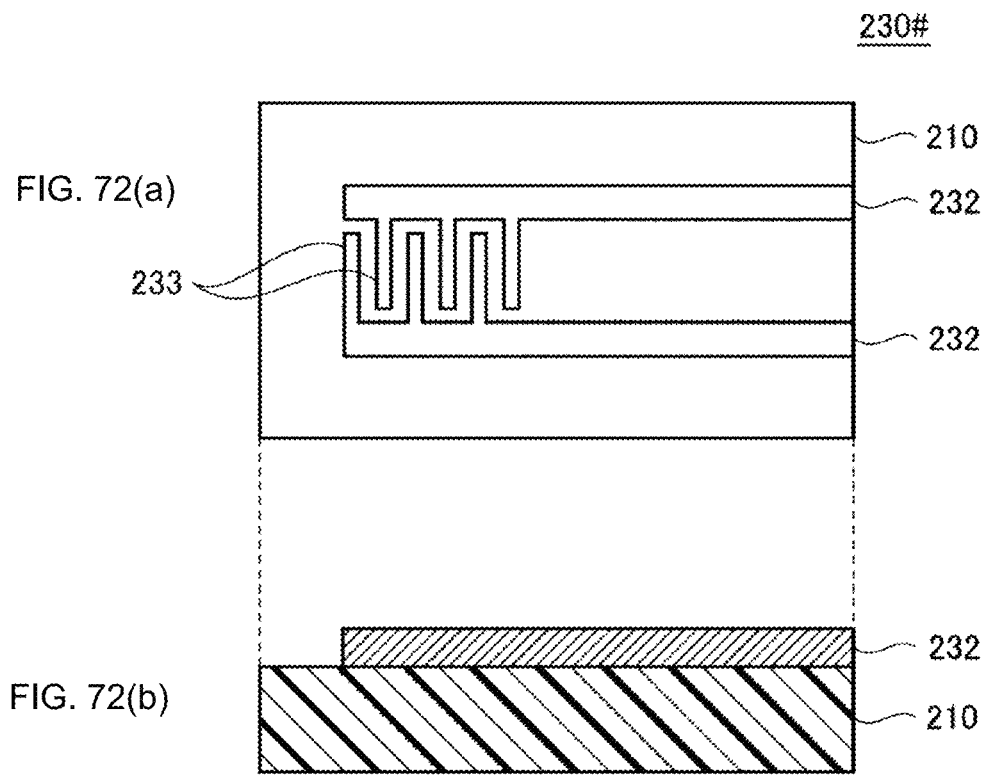
FIGS. 72(a)-72(b) is a view showing a humidity sensor unit of a comparative example.
FIG. 73 is a diagram showing changes in the capacitance of the humidity sensor unit in accordance with aspects of the present disclosure and the humidity sensor unit of the comparative example.

In the humidity sensor unit 230, with the comb electrode 233 forming the capacitor being covered with the moisture-sensitive member, even when water droplets adhere to the surface of the humidity sensor material caused by dew condensation, a short circuit between the electrodes and an increase in the electrode area due to the adhesion of the water droplets may be prevented, and an influence on a measured value may be eliminated, as compared to when the moisture-sensitive member 231 is not provided and the comb electrode 233 is exposed as in a humidity sensor unit 230# of the comparative example shown in FIGS. 72(a)-(b).

With the comb electrode 233 being disposed inside the moisture-sensitive member, it is possible to prevent the corrosion of the electrodes by corrosive gas such as sulfur gas or nitrogen gas in the atmosphere. Therefore, the humidity may be measured without causing a deterioration in characteristics even in the presence of corrosive gas.

With the comb electrode 233 being disposed inside the moisture-sensitive member, an area in which water molecules from the outside may be sucked to the humidity sensor material without being blocked by the electrodes becomes wider, and the sensitivity may be increased.

A specific example of the RFID sensor 200 in FIG. 69 will be described in detail. In a specific example, a polyimide (PI) sheet (sheet thickness of 15 μm) having capacitance changing due to humidity was used as the material of the substrate 210. On the substrate 210, the antenna 220 and the comb electrode 233 shown in FIGS. 71(a)-(b) are formed by screen printing using Ag paste. Further, polyimide varnish, in which a polyamic acid is dissolved in an N-methyl-2 pyrrolidone (NMP) solvent, is printed on the comb electrode by screen printing, dried at a temperature of 130° C. for 30 minutes, and then fired at a temperature of 350° C. for one hour. Thereafter, the IC 240 for RFID is mounted on the substrate to complete the RFID sensor 200.

FIG. 73 shows the rate of change in capacitance accompanying a change in humidity between the RFID sensor using the humidity sensor unit 230 in FIGS. 71(a)-(b) described above and the RFID sensor using the humidity sensor unit 230# of the comparative example in FIGS. 72(a)-(b). In FIG. 73, in the RFID sensor according to an aspect of the disclosure, the rate of change in capacitance when the relative humidity changed from 10% to 90% was 149.2%, whereas in the RFID sensor of the comparative example, the rate of change was 77.4%. That is, it is understood that the RFID sensor according to an aspect of the disclosure, in which the periphery of the comb electrode may be entirely covered with polyimide, has higher sensitivity than the RFID sensor of the comparative example.

As described above, in the RFID humidity sensor according to an aspect of the disclosure, the comb electrode of the humidity sensor electrode is formed inside the moisture-sensitive member, so that the sensitivity of the RFID humidity sensor is improved, and the occurrence of a short circuit between the electrodes caused by dew condensation and the influence of corrosive gas may be prevented. In addition, the humidity data may be read by radio communication using the RFID, and hence wiring for reading the data may become unnecessary.

According to an aspect of the disclosure, as the humidity sensor unit 230, the configuration described above may be used. In this case, the first terminal T1 and the second terminal T2 correspond to the humidity sensor electrode 232 described above, the moisture-sensitive member 2 (2A, 2B) corresponds to the substrate 210 and the moisture-sensitive member 231 described above, and the first electrode E1 and the second electrode E2 correspond to the comb electrode 233 described above.

FIGS. 74(a)-(b) are diagrams showing a first modification of the humidity sensor unit in FIG. 69. In a humidity sensor unit 230A of the first modification, an arbitrary material is used as a substrate 210A having an antenna or the like formed thereon, and a laminated structure of a moisture-sensitive member 235, the humidity sensor electrode 232 (comb electrode 233), and the moisture-sensitive member 231 is formed on the substrate 210A.

As the material of the substrate 210A, for example, polyethylene terephthalate (PET), polypropylene (PP), polyvinyl chloride (PVC), or the like may be used. As the moisture-sensitive member, as described above, for example, polyimide (PI), polyamide-imide (PAD, cellulose acetate butyrate (CAB), polymethyl methacrylate (PMMA), vinyl crotonate, polyethylene terephthalate, and mixtures thereof may be used.

In a specific example, PET was used as the substrate 210A. Polyamide-imide varnish, in which polyamide-imide is dissolved in an N-methyl-2 pyrrolidone (NMP) solvent, is printed on the substrate 210A by screen printing and dried at a temperature of 130° C. for one hour to form the moisture-sensitive member 235 of polyamide-imide (PAD. The comb electrodes 233 are printed on the moisture-sensitive member 235 of polyamide-imide by screen printing using Ag paste, and the antenna 220 and the wiring pattern 250 are printed on the substrate 210A using Ag paste and dried at 130° C. for 30 minutes to form these metal members. Thereafter, polyamide-imide varnish is further printed on the comb electrode 233 by screen printing and dried at a temperature of 130° C. for one hour to form the moisture-sensitive member 231.

In the configuration of the first modification as thus described, the comb electrode of the humidity sensor electrode may be formed inside the moisture-sensitive member regardless of the type of the substrate having the RFID tag formed thereon, so that the sensitivity of the RFID humidity sensor may be improved, and the occurrence of a short circuit between the electrodes caused by dew condensation and the influence of corrosive gas may be prevented.

In the first modification as well, as the humidity sensor unit 230A, the configuration described above may be used. In this case, the first terminal T1 and the second terminal T2 correspond to the humidity sensor electrode 232 described above, the moisture-sensitive member 2 (2A, 2B) corresponds to the moisture-sensitive members 231, 235 described above, and the first electrode E1 and the second electrode E2 correspond to the comb electrode 233 described above.

In each of the aspects of the disclosure described above, the configuration in which the humidity sensor electrode is formed on the substrate of the RFID sensor has been described. In a second modification, a description will be given of a configuration in which a chip-type humidity sensor as illustrated in each of aspects of the disclosure described above, is mounted on the RFID tag.

FIGS. 75(a)-(b) are diagrams showing a second modification of the humidity sensor unit in FIG. 69. In a humidity sensor unit 230B of the first modification, an arbitrary material is used as a substrate 210B having an antenna or the like formed thereon, and the humidity sensor 1, having realized the humidity sensor described above and the like in a chip type, is mounted. The first terminal T1 and the second terminal T2 of the humidity sensor 1 (FIG. 1) are connected to the antenna 220 through the wiring pattern 250.

In such a configuration as well, in the chip type humidity sensor 1, with the humidity sensor electrode (first electrode unit E1 and second electrode unit E2) being formed inside the moisture-sensitive member 2, the sensitivity of the RFID humidity sensor is improved, and the occurrence of a short circuit between the electrodes caused by dew condensation and the influence of corrosive gas may be prevented.

The description of the aspects disclosed should be considered as being illustrative in all respects and not being restrictive. The scope of the present invention is shown by the claims rather than by the above description, and is intended to include meanings equivalent to the claims and all changes in the scope. While preferred aspects of the invention have been described above, it is to be understood that variations and modifications will be apparent to those skilled in the art without departing from the scope and spirit of the invention.

DESCRIPTION OF REFERENCE SYMBOLS 1, 11, 260: Humidity sensor
2, 2A, 2B, 2D, 2E, 2F: Member
12, 210, 210A, 210B: Substrate
13, 16, 18, 26, 28: Polyimide sheet
14, 24: Via
22: Polyimide precursor sheet
30, 40, 70, 80, 90, 100, 110, 120: Sensor element
31, 51, 61, 71, 230, 230A, 230B, 230C: Humidity sensor unit
32, 33, 37, 38, 42, 43, 47, 48, 72, 77, 78, 82, 87, 88, 92, 93, 102, 103, 112, 113, 122, 123, T1, T2: Terminal
36, 56, 66, 76: Temperature sensor unit
41, 46, 81, 86: Sensor unit
53: Common electrode
57, 58: Thermistor electrode
94, 95, 104, 105, 106, 114, 115, 124, 127, FP: Portion
200: RFID sensor
220: Antenna
231, 235: Moisture-sensitive member 232: Humidity sensor electrode
233: Comb electrode
A: amplifier element
C1, C2: Capacitor
E1, E2, E3, E11B, E11A, E21, E22: Electrode
E1A, E2A: Electrode unit
E1B: Contact portion
E11B: Lower electrode
E11A: Upper electrode
L: Coil
L1 to L73: Laminated sheet
R: Resistor
S1 to S4: Main surface

What is claimed is:

1. A humidity sensor comprising:
a first electrode electrically connected to a first terminal; and
a moisture-sensitive member having a dielectric constant configured to change in accordance with humidity, wherein the first electrode includes a first internal electrode unit configured in a meandering shape including a first main surface covered with the moisture-sensitive member, and a second main surface covered with the moisture-sensitive member; and
a second electrode electrically connected to a second terminal;
wherein the first electrode is disposed on a first plane inside the moisture-sensitive member, and the second electrode is disposed on a second plane inside the moisture-sensitive member, the second plane parallel to the first plane, and the second plane located above the first plane when viewed in a plan view.

2. The humidity sensor according to claim 1,
wherein the second electrode includes a second internal electrode unit having a third main surface covered with the moisture-sensitive member, and a fourth main surface covered with the moisture-sensitive member,
wherein the first internal electrode unit and the second internal electrode unit are disposed across the moisture-sensitive member.

3. The humidity sensor according to claim 2, wherein the first electrode is connected between the first terminal and the second terminal to form a coil covered with the moisture-sensitive member.

4. The humidity sensor according to claim 1, wherein the first electrode further includes an external electrode unit having a fifth main surface covered with the moisture-sensitive member and a sixth main surface not covered with the moisture-sensitive member.

5. The humidity sensor according to claim 1, further comprising:
a temperature-sensitive member integrated with the moisture-sensitive member,
wherein, in the temperature-sensitive member, a resistivity changes in accordance with a change in temperature.

6. The humidity sensor according to claim 1, wherein the moisture-sensitive member comprises a composite material that includes a first material having a capacitance that changes in accordance with a change in humidity, and a second material having a dielectric constant different from a dielectric constant of the first material.

7. The humidity sensor according to claim 1, wherein the moisture-sensitive member comprises a composite material that includes a first material having capacitance that changes in accordance with a change in humidity, and a second material being a magnetic sub stance.

8. The humidity sensor according to claim 1, wherein the moisture-sensitive member comprises a composite material that includes a first material having capacitance that changes in accordance with a change in humidity, a second material having a dielectric constant different from a dielectric constant of the first material, and a third material being a magnetic substance.

9. The humidity sensor according to claim 1, wherein the first electrode includes a plurality of first internal electrode units.

10. The humidity sensor according to claim 9, wherein the plurality of first internal electrode units are disposed on the first plane inside the moisture-sensitive member.

11. The humidity sensor according to claim 9, wherein the plurality of first internal electrode units in the first electrode are disposed respectively on a plurality of planes parallel to each other inside the moisture-sensitive member.

12. The humidity sensor according to claim 1,
wherein the moisture-sensitive member comprises a composite material that includes a first material having capacitance that changes in accordance with a change in humidity, and
wherein the moisture-sensitive member includes a first portion and a second portion, with the second portion being disposed closer to a main surface of the humidity sensor than the first portion and has a higher proportion of the first material than the first portion.

13. A radio-frequency identification (RFID) tag comprising:
a humidity sensor comprising:
a first electrode electrically connected to a first terminal; and
a moisture-sensitive member having a dielectric constant configured to change in accordance with humidity, wherein the first electrode includes a first internal electrode unit configured in a meandering shape including a first main surface covered with the moisture-sensitive member, and a second main surface covered with the moisture-sensitive member; and
a second electrode electrically connected to a second terminal;
wherein the first electrode is disposed on a first plane inside the moisture-sensitive member, and the second electrode is disposed on a second plane inside the moisture-sensitive member, the second plane parallel to the first plane, and the second plane located above the first plane when viewed in a plan view;
an antenna connected to the first terminal and the second terminal of the humidity sensor; and
an integrated circuit configured to detect a change in impedance of a circuit that includes the humidity sensor and the antenna.

14. The radio-frequency identification (RFID) tag according to claim 13,
wherein the second electrode includes a second internal electrode unit having a third main surface covered with the moisture-sensitive member, and a fourth main surface covered with the moisture-sensitive member, and
wherein the first internal electrode unit and the second internal electrode unit are disposed across the moisture-sensitive member.

15. The radio-frequency identification (RFID) tag according to claim 13, wherein the humidity sensor and the antenna are electrically connected by a wiring pattern, and wherein an inductance component and a capacitance component of the antenna and the humidity sensor form the circuit.

16. The radio-frequency identification (RFID) tag according to claim 15, wherein, when the integrated circuit receives power by a RFID reader, the integrated circuit measures the impedance of the circuit.

17. The radio-frequency identification (RFID) tag according to claim 16, wherein the integrated circuit determines the humidity based on a predetermined relationship of the measured impedance.

18. The radio-frequency identification (RFID) tag according to claim 17, wherein the antenna transmits the determined humidity.

* * * * *